(12) United States Patent
Matsumoto et al.

(10) Patent No.: US 6,504,803 B2
(45) Date of Patent: Jan. 7, 2003

(54) OPTICAL DISK APPARATUS

(75) Inventors: Toshio Matsumoto, Kyoto (JP); Yasumori Hino, Nara (JP); Takashi Inoue, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 64 days.

(21) Appl. No.: 09/862,114

(22) Filed: May 21, 2001

(65) Prior Publication Data

US 2002/0009030 A1 Jan. 24, 2002

(30) Foreign Application Priority Data

May 22, 2000 (JP) .................................... 2000-150301
Jan. 25, 2001 (JP) .................................... 2001-017565
Apr. 27, 2001 (JP) .................................... 2001-131845

(51) Int. Cl.[7] ................................................ G11B 7/00
(52) U.S. Cl. ................................ 369/47.53; 369/59.11; 369/116
(58) Field of Search ........................... 369/47.1, 47.12, 369/47.49, 47.5, 47.51, 47.52, 47.53, 53.1, 53.11, 59.1, 59.11, 116

(56) References Cited

U.S. PATENT DOCUMENTS 5,687,156 A * 11/1997 Hurst, Jr. .................... 369/116
5,790,482 A * 8/1998 Saga et al. ............... 369/47.51
6,275,462 B1 * 8/2001 Masaki et al. .............. 369/116

FOREIGN PATENT DOCUMENTS

JP   2-27495    1/1990
JP   3-232141   10/1991

* cited by examiner

*Primary Examiner*—Muhammad Edun
(74) *Attorney, Agent, or Firm*—Merchant & Gould P.C.

(57) ABSTRACT

While a control portion changes the laser power stepwise with a laser power control portion, the optical disk apparatus of the present invention compares a predetermined level with an output by a detector that detects the correlation between a pattern to be recorded on the optical disk and the reproduction signal of the recording pattern detects as the minimum recording power the recording power when the originally smaller of the predetermined level and that output by the detector becomes larger than the other, and sets the optimum recording power to a power obtained by multiplying the detected minimum recording power by a certain factor.

36 Claims, 19 Drawing Sheets

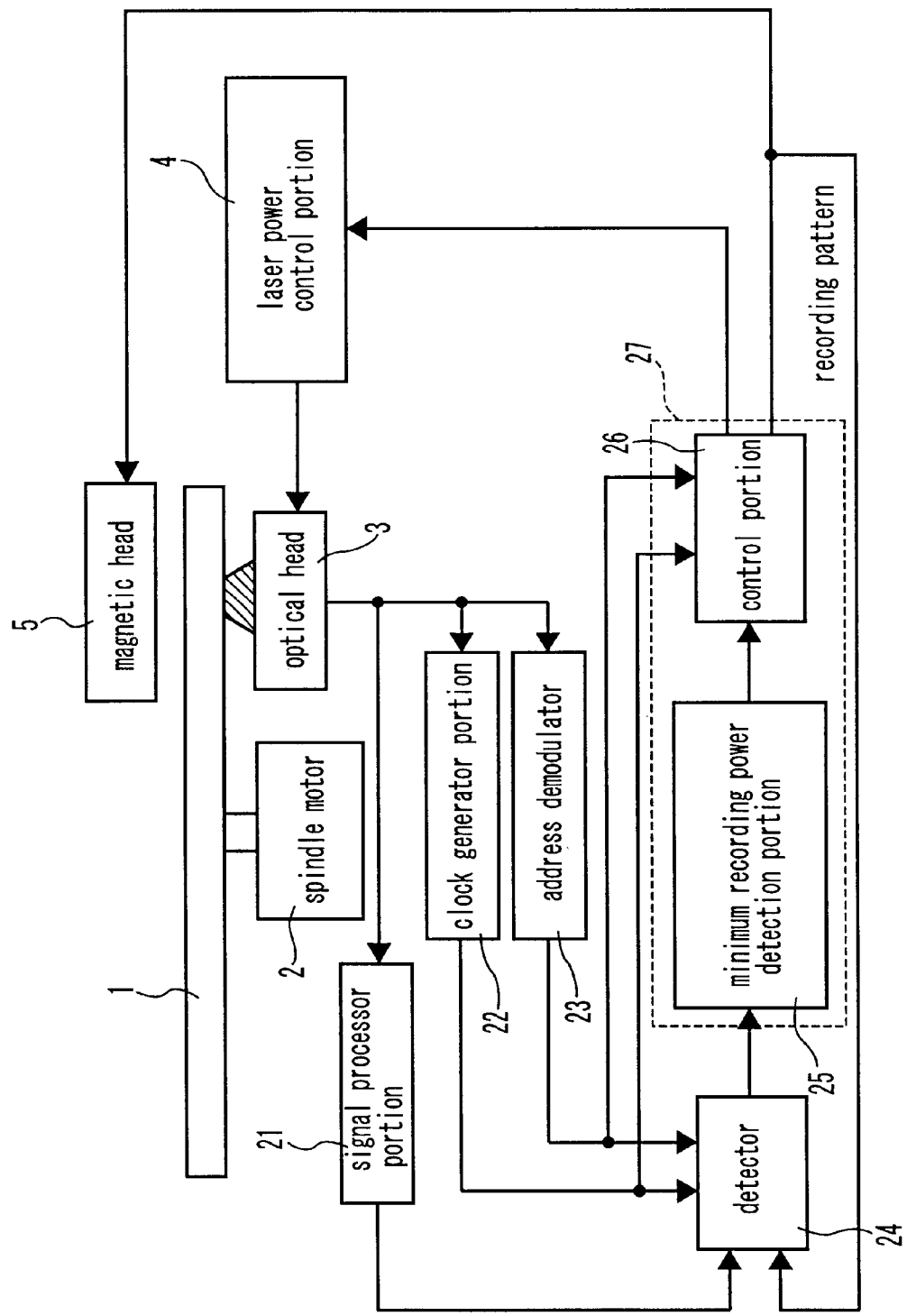
F I G. 1 circumferential position on the disk

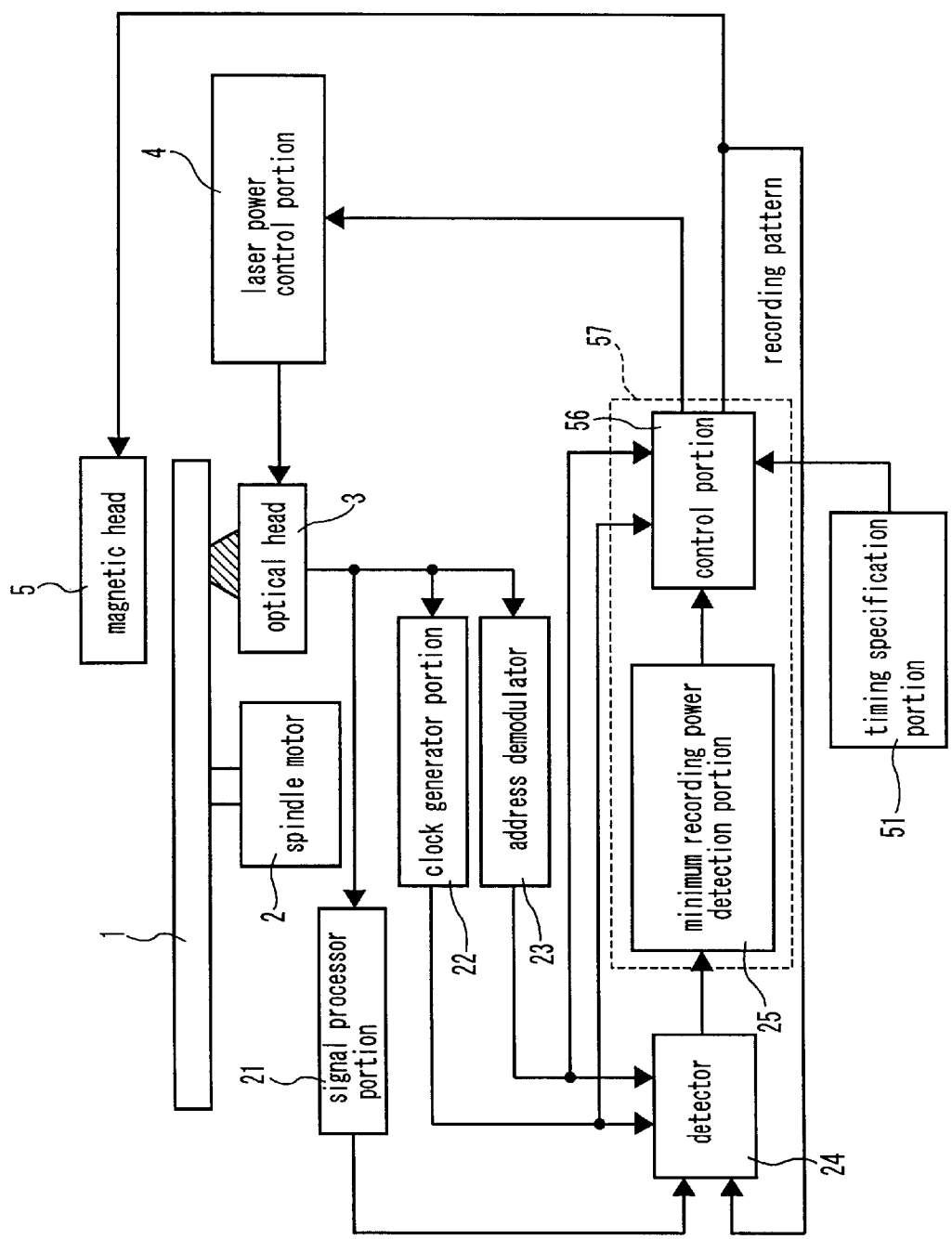
F I G. 7

W(◆): wide track pitch
N(◇): narrow track pitch

| min. linear speed | max. linear speed | αv |
|---|---|---|
| Vmin1 | Vmax1 | αv1 |
| Vmin2 | Vmax2 | αv2 |
| Vmin3 | Vmax3 | αv3 |
| . | . | . |
| VminN | VmaxN | αvN |
| . | . | . |

Vmin1<Vmin2<··<VminN
αv1< αv2 <··< αvN

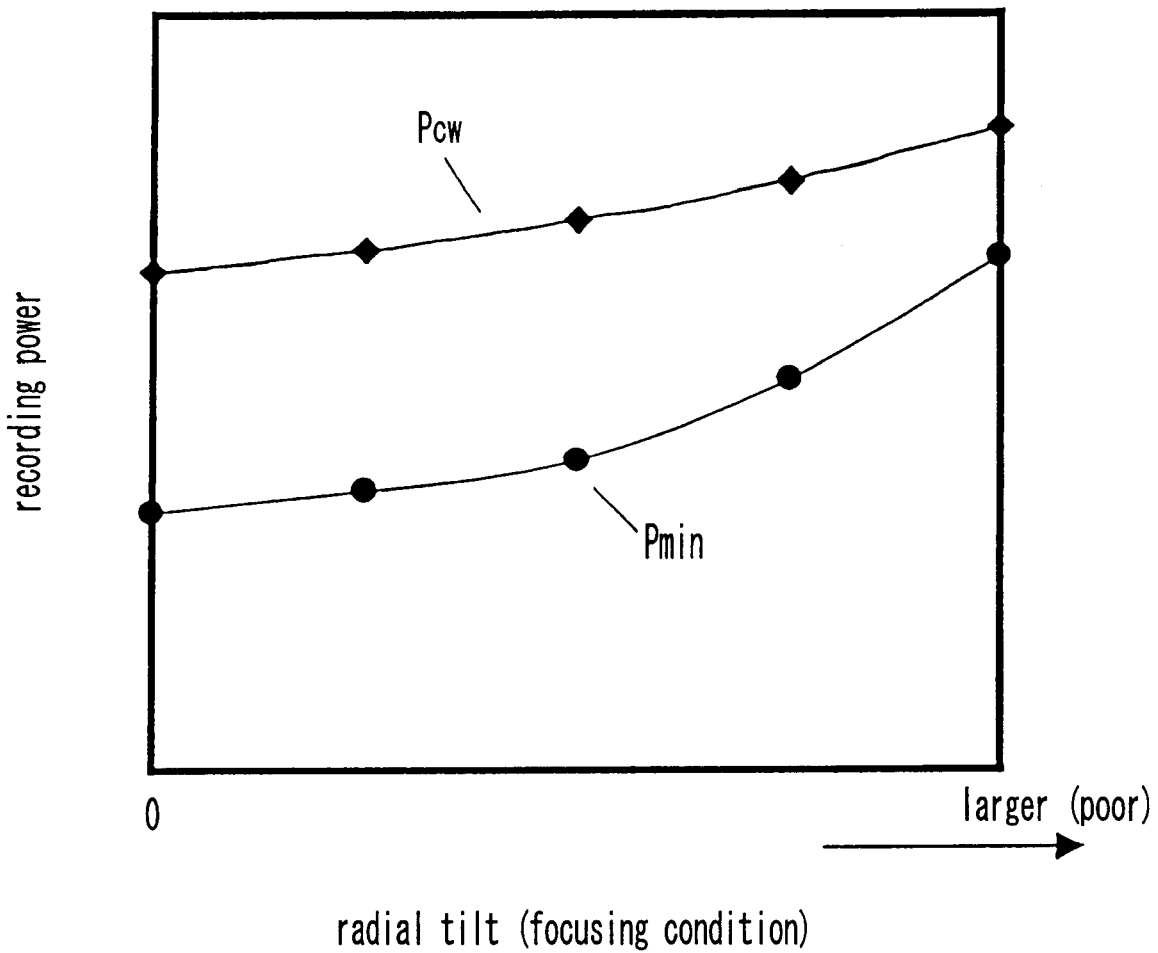
F I G. 1 5

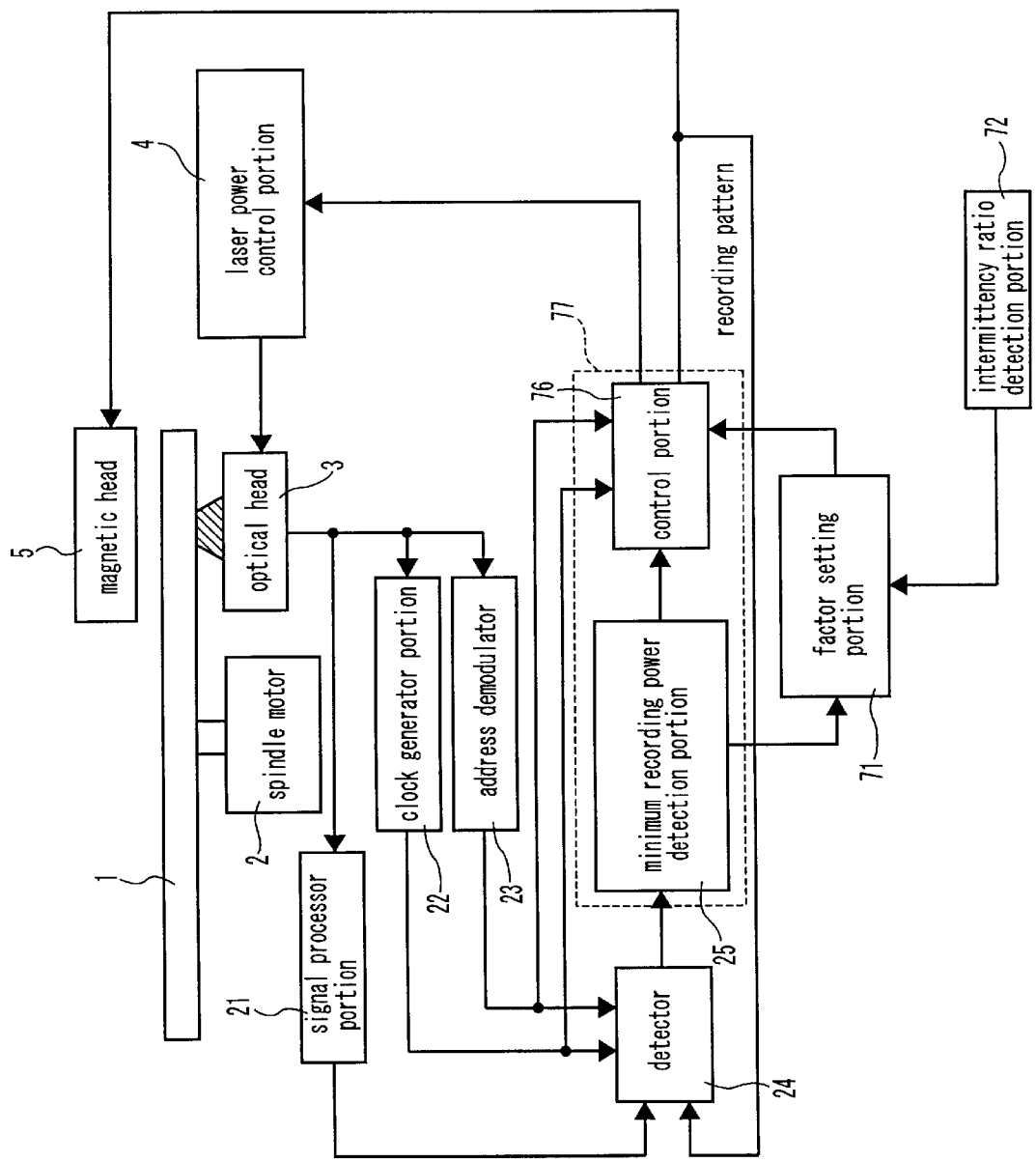
F I G. 16

OPTICAL DISK APPARATUS

BACKGROUND OF THE INVENTION

1. Field of the Invention

The present invention relates to an optical disk apparatus for recording and reproducing information on an optical disk.

2. Related Background Art

In recent years, optical disks have become the mainstream for information recording media with large storage capacity, as used for example for data of multi-media applications. In order to increase their capacity even further, optical disks with high density storage capability (referred to in short as "high-density disks" in the following) are being proposed continuously.

The main strategies in achieving higher densities are making the recording marks shorter and making the track pitch narrower. However, as the densities increase, changes in the focusing condition of the light beam due to defocusing or tilting of the disk during recording or reproduction exert a greater influence on the signal quality, such as the S/N ratio for example. Therefore, it is preferable to record at a laser power in which the decrease of the equivalent laser power due to the change in the focusing condition is compensated.

With regard to this problem, a method has been proposed, that detects the minimum recording power for forming reproducible recording marks (that is, at the reproducible limit) on the optical disk (referred to as "minimum recording power" or "Pmin" in the following), and that sets the laser power used for recording data to an optimum recording power obtained by multiplying this Pmin by a certain factor (see for example, JP H03-232141A).

The following is an explanation of an example of such a conventional optical disk apparatus, with reference to the accompanying drawings.

FIG. 18 is a block diagram illustrating the configuration of a conventional optical disk apparatus. In FIG. 18, numeral 1 denotes an optical disk, numeral 2 denotes a spindle motor for rotating the optical disk 1, and numeral 3 denotes an optical head focusing laser light on the optical disk 1 and detecting recorded information from the light reflected by the optical disk 1. Numeral 4 denotes a laser power control portion, which sets the laser power depending on information input from a control portion 9 explained below, and numeral 5 denotes a magnetic head for the recording of signals. Numeral 6 denotes a band-pass filter (BPF), and numeral 7 denotes a detector for detecting the strength of the reproduction signal. Numeral 8 denotes a minimum recording power detection portion for detecting Pmin. Numeral 9 is a control portion, which controls the spindle motor 2, the optical head. 3, the laser power control portion 4, and the magnetic head 5 and sets the optimum recording power.

The following is an explanation of the operation of an optical disk apparatus with the above configuration.

To set the laser power used for the recording of data, first, the laser power control portion 4 sets the power based on information from the control portion 9. The control portion 9 controls the optical head 3 and the magnetic head 5, and lets them record a single-frequency signal on the optical disk 1. Then, this signal is reproduced with the optical head 3, and after band limiting with the band-pass filter 6, which has a pass band including the recorded frequency, the signal strength of the output signal is detected with the detector 7 and input into the minimum recording power detection portion 8.

Repeating this operation while changing the value to which the recording power is set leads to a dependency of the reproduction signal intensity on the recording power as shown in FIG. 19. The minimum recording power detection portion 8 detects Pmin by approximate calculation from the recording power dependency shown in FIG. 19. The detected Pmin is input into the control portion 9. Multiplying Pmin by a factor and taking the resulting value as the optimum recording power, the control portion 9 sets the laser power used for the recording of data, thus making it possible to preserve constant recording conditions, even when the focusing of the light beam or the temperature of the optical disk change.

However, in this configuration, Pmin is detected using the signal strength of the reproduction signal, so that Pmin has to be detected in regions in which no data has yet been recorded. Therefore, the detection of Pmin has to be performed in a predetermined region provided on the optical disk as a power setting region for example, or, if the detection of Pmin is performed in the data recording region, then the data recorded in that region have to be deleted beforehand. In the former case, the space on the optical disk that cannot be used for the recording of data increases, so that the data recording capacity decreases, whereas the latter case causes a rotational delay for deleting the data and the detection of Pmin takes extra time, and furthermore, there is the risk that during the deletion, the data on neighboring tracks are deleted as well (cross-erasing).

SUMMARY OF THE INVENTION

It is an object of the present invention to provide an optical disk apparatus, wherein, when taking a data recording region as the region for detecting the minimum recording power, it is not necessary to delete beforehand data that are recorded in that region, and in which Pmin can be detected with high precision and in a short time.

In order to attain this object, in accordance with the present invention, a first optical disk apparatus for recording and reproducing data by irradiating a light beam onto an optical disk includes a recording portion for recording information on the optical disk; a laser power control portion for controlling a laser power of the recording portion; a reproduction portion for reproducing information recorded on the optical disk; a correlation detection portion for detecting a correlation between a recording pattern to be recorded on the optical disk by the recording portion and a reproduction signal obtained when the recording pattern is reproduced by the reproduction portion; and an optimum recording power setting portion which detects a minimum recording power at which reproducible recording marks are formed on the optical disk, and sets an optimum recording power to a power obtained by multiplying this minimum recording power by a recording compensating factor; wherein the optimum recording power setting portion compares a predetermined level with an output by the correlation detection portion that is obtained when the laser power is changed stepwise by the laser power control portion, detects as the minimum recording power the recording power when the originally smaller of the predetermined level and that output by the correlation detection portion becomes larger than the other, and sets the optimum recording power.

In this first optical disk apparatus, it is preferable that the optimum recording power setting portion detects the minimum recording power in a plurality of regions on the optical disk, and sets a common optimum recording power for this plurality of regions.

In this first optical disk apparatus, it is also preferable that the recording of data is interrupted if the optimum recording power setting portion determines, based on the detected minimum recording power, that no suitable optimum recording power exists.

In this first optical disk apparatus, it is also preferable that the recording portion records a recording pattern in which the frequency of "0"s and "1"s when detecting the minimum recording power is substantially equal.

In this first optical disk apparatus, it is also preferable that the recording portion records a different recording pattern each time the minimum recording power is detected.

In order to attain the above-mentioned object, in accordance with the present invention, a second optical disk apparatus for recording and reproducing data by irradiating a light beam onto an optical disk includes a recording portion for recording information on the optical disk; a laser power control portion for controlling a laser power of the recording portion; a reproduction portion for reproducing information recorded on the optical disk; a correlation detection portion for detecting a correlation between a recording pattern to be recorded on the optical disk by the recording portion and a reproduction signal obtained when the recording pattern is reproduced by the reproduction portion; an optimum recording power setting portion which detects a minimum recording power at which reproducible recording marks are formed on the optical disk, and sets an optimum recording power to a power obtained by multiplying this minimum recording power by a recording compensating factor; and a position specification portion for specifying a position on the optical disk where the minimum recording power is detected; wherein the optimum recording power setting portion compares a predetermined level with an output by the correlation detection portion that is obtained when the laser power at the position specified by the position specification portion is changed stepwise by the laser power control portion, detects as the minimum recording power the recording power when the originally smaller of the predetermined level and that output by the correlation detection portion becomes larger than the other, and sets the optimum recording power.

In this second optical disk apparatus, it is preferable that the position specification portion specifies a data recording region.

In order to attain above-mentioned object, in accordance with the present invention, a third optical disk apparatus for recording and reproducing data by irradiating a light beam onto an optical disk having a power setting region provided separately from a data recording region, the optical disk apparatus includes a recording portion for recording information on the optical disk; a laser power control portion for controlling a laser power of the recording portion; a reproduction portion for reproducing information recorded on the optical disk; a correlation detection portion for detecting a correlation between a recording pattern to be recorded on the optical disk by the recording portion and a reproduction signal obtained when the recording pattern is reproduced by the reproduction portion; an optimum recording power setting portion which detects a minimum recording power at which reproducible recording marks are formed on the optical disk, and sets an optimum recording power to a power obtained by multiplying this minimum recording power by a recording compensating factor; a position specification portion for specifying a position on the optical disk where the minimum recording power is detected; and a detection power specification portion, which specifies a maximum laser power used for detecting the minimum recording power; wherein the position specification portion specifies the power setting region before the data recording region, and the optimum recording power setting portion compares a predetermined level with an output by the correlation detection portion that is obtained when the laser power at the position specified by the position specification portion is changed stepwise by the laser power control portion, detects as the minimum recording power the recording power when the originally smaller of the predetermined level and that output by the correlation detection portion becomes larger than the other, sets the optimum recording power to that recording power, inputs the detected minimum recording power into the detection power specification portion, and determines the maximum laser power.

In order to attain above-mentioned object, in accordance with the present invention, a fourth optical disk apparatus for recording and reproducing data by irradiating a light beam onto an optical disk includes a recording portion for recording information on the optical disk; a laser power control portion for controlling a laser power of the recording portion; a reproduction portion for reproducing information recorded on the optical disk; a correlation detection portion for detecting a correlation between a recording pattern to be recorded on the optical disk by the recording portion and a reproduction signal obtained when the recording pattern is reproduced by the reproduction portion; an optimum recording power setting portion which detects a minimum recording power at which reproducible recording marks are formed on the optical disk, and sets an optimum recording power to a power obtained by multiplying this minimum recording power by a recording compensating factor; and a timing specification portion specifying a timing for detecting the minimum recording power; wherein the optimum recording power setting portion compares a predetermined level with an output by the correlation detection portion that is obtained when the laser power is changed stepwise by the laser power control portion at the timing specified by the timing specification portion, detects as the minimum recording power the recording power when the originally smaller of the predetermined level and that output by the correlation detection portion becomes larger than the other, and sets the optimum recording power.

In this fourth optical disk apparatus, it is preferable that a temperature change near the optical disk is detected and the timing specification portion specifies a time when that temperature change has reached a predetermined value as the timing for detecting the minimum recording power.

In this fourth optical disk apparatus, it is also preferable that the timing specification portion specifies a time when a predetermined time has passed after detecting the minimum recording power as the timing for detecting the minimum recording power.

With the above-described configurations, when taking a data recording region as the region for detecting the minimum recording power, it is not necessary to delete beforehand data that are recorded in that region, and Pmin can be detected with high precision and in a short time.

Furthermore, it is possible to detect Pmin at positions (sectors) immediately prior to recording, so that even in the case of tilting or warping of the optical disk, or temporal changes such as defocusing or temperature changes, it is still possible to set an optimum recording power.

Furthermore, by detecting Pmin in a power setting region, and specifying a maximum laser power used for the detection of Pmin based on that value, it is possible to prevent cross-writing in high-density disks.

Furthermore, when the temperature changes abruptly, then this is detected, Pmin is detected again, and the recording power used for the recording of data is set again, so that it is still possible to set an optimum recording power.

It is preferable that the above-described first to fourth optical disk apparatuses further include a factor setting portion for setting the value of said recording compensating factor.

Furthermore, it is preferable that the factor setting portion sets the value of said recording compensating factor in accordance with a temperature of the optical disk.

It is also preferable that the factor setting portion sets the value of said recording compensating factor in accordance with a linear speed of the optical disk.

It is also preferable that the factor setting portion sets the value of said recording compensating factor in accordance with a focusing condition of the light beam. In that case, the focusing condition of the light beam can be determined from the minimum recording power at which reproducible recording marks are formed.

If the optical disk apparatus records data by irradiating the light beam intermittently, then it is preferable that the factor setting portion sets the value of said recording compensating factor in accordance with an intermittency ratio of the light beam.

With the above-described configuration, it becomes possible to set the recording compensating factor by which the minimum recording power is multiplied when setting the laser power used for the recording of data (optimum recording power) to an optimum value in accordance with, for example, the focusing condition of the light beam at the time of recording.

Furthermore, if the light beam is irradiated intermittently during the recording, it is possible to set the recording compensating factor by which the minimum recording power is multiplied to an optimum value in accordance with the intermittency ratio.

These and other objects, features and advantageous effects of the present invention will become apparent from the following description, with reference to the accompanying drawings.

BRIEF DESCRIPTION OF THE DRAWINGS

FIG. 1 is a block diagram illustrating the configuration of an optical disk apparatus according to the first embodiment of the present invention.

FIG. 7 is a block diagram illustrating the configuration of an optical disk apparatus according to the fourth embodiment of the present invention.

FIG. 15 illustrates how the recording power depends on the focusing condition.

FIG. 16 is a block diagram illustrating the configuration of an optical disk apparatus according to the sixth embodiment of the present invention.

DETAILED DESCRIPTION OF THE INVENTION

Figure 2A:
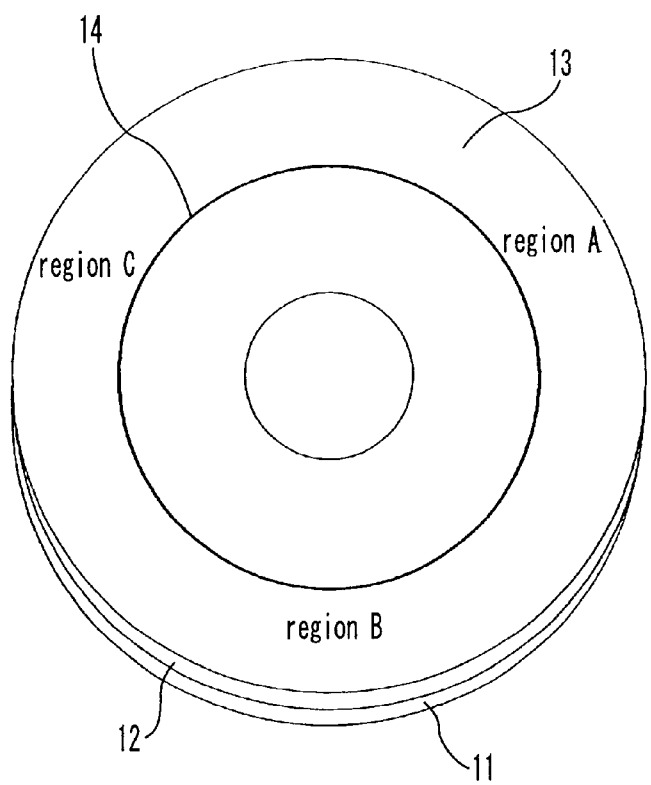
FIG. 2A illustrates the configuration of an optical disk in accordance with the first, second, fourth, fifth and sixth embodiments of the present invention.

The following is a description of preferred embodiments of the present invention, with reference to FIGS. 1 to 17.
First Embodiment FIG. 1 is a block diagram illustrating the configuration of an optical disk apparatus according to the first embodiment of the present invention.

In FIG. 1, numeral 1 denotes an optical disk, numeral 2 denotes a spindle motor for rotating the optical disk, and numeral 3 denotes an optical head (reproduction portion) focusing laser light on the optical disk 1 and detecting recorded information from the light reflected by the optical disk 1. Numeral 4 denotes a laser power control portion, which sets the laser power according to information input from a control portion 26 explained below, and numeral 5 is a magnetic head for the recording of signals. Numeral 25 denotes a minimum recording power detection portion, which detects a minimum recording power Pmin at which reproducible recording marks can be formed on the optical disk 1 (that is, at the reproducible limit). Numeral 26 denotes a control portion, which controls the spindle motor 2, the optical head 3, the laser power control portion 4, and the magnetic head 5, and sets an optimum recording power. Numeral 21 denotes a signal processor, which performs a predetermined process on the reproduction signal, numeral 22 denotes a clock generator for generating a clock that is used for the recording and the reproduction of signals, and numeral 23 denotes an address demodulator for demodulating addresses. Numeral 24 denotes a detector (correlation detection portion) for detecting the correlation between a known recording pattern and a reproduction signal that is obtained when reproducing this known recording pattern.

The minimum recording power detection portion 25 and the control portion 26 constitute an optimum recording power setting portion 27.

Furthermore, the optical head 3 and the magnetic head 5 constitute a recording portion. It should be noted that in phase-changing optical disks for example, the recording portion is constituted by the optical head 3 alone.

FIG. 2A illustrates the configuration of an optical disk 1 in accordance with the first embodiment of the present invention. The optical disk 1 shown in FIG. 2A can also be used for the second, fourth, fifth and sixth embodiments.

In FIG. 2A, numeral 11 denotes a substrate, numeral 12 denotes a recording film, numeral 13 denotes a data recording region for recording data, and numeral 14 denotes a track.

The following is an explanation of the operation of an optical disk apparatus with the above configuration.

Based on information from the control portion 26 the optical head 3 irradiates a light beam on the optical disk 1, and detects its reflected light, which it converts into an electric signal. This detection signal is fed to the signal processor 21, the clock generator 22, the address demodulator 23, and to a focus control portion and a tracking control portion that are not shown in the drawings.

A reproduction signal depending on the recording information recorded on the optical disk 1 is supplied to the signal processor 21, which performs noise reduction, for example.

The clock generator 22 derives clock generation information from the signal supplied by the optical head 3, and generates a clock used for signal recording and reproduction. This clock is supplied to the control portion 26 and the detector 24.

In optical disks with sampled-servo format, clock pits serving as clock generation information are pre-recorded (pre-formatted) over the entire circumference of the disk, and the clock used for recording and reproduction can be generated by detecting this information from the signal supplied from the optical head 3 and dividing it using a PLL, for example. Of course, the clock generation information does not necessarily have to be recorded in pits, and it also can be provided through the presence or absence of grooves, or in grooves wobbling at a certain frequency. Moreover, there is no limitation to sampled-servo format optical disk apparatuses, and any optical disk apparatus that uses substantially the same clock for recording and reproduction is suitable.

The address demodulator 23 derives address information from the signal supplied by the optical head 3, demodulates the addresses based on this information, and detects the address in order to determine to which position the light beam is irradiated on the optical disk 1. The detected address is then supplied to the control portion 26 and the detector 24.

Figure 3:
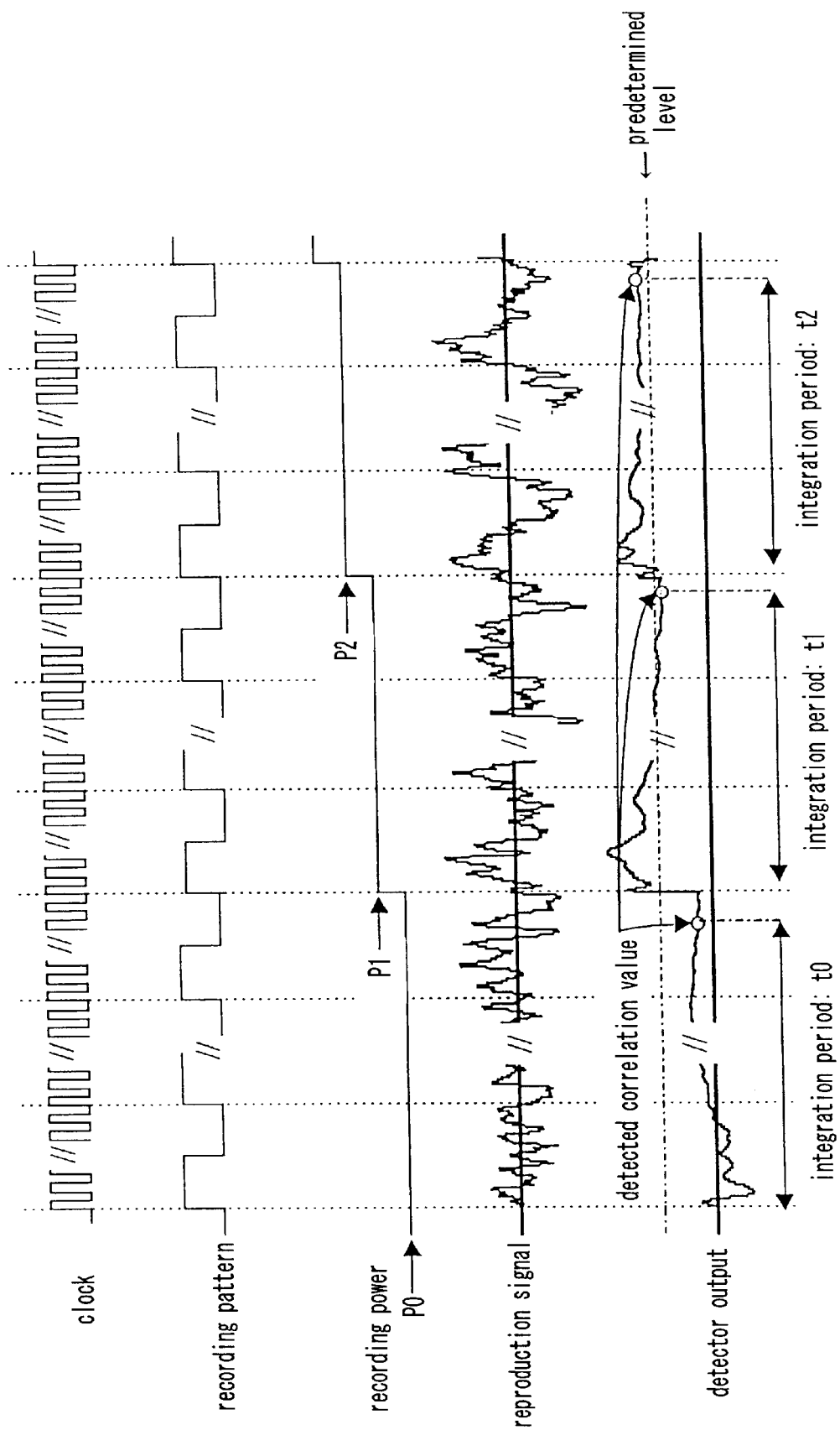
FIG. 3 is a signal waveform chart for the various elements of the optical disk apparatus in FIG. 1.

The following is an explanation of the operation of the optimum recording power setting portion 27 and the detector 24, referring to the timing chart in FIG. 3. FIG. 3 shows the clock that is generated by the clock generator 22, the recording pattern synchronized with that clock, the recording power that is controlled by the laser power control portion 4, the reproduction signal given out by the signal control portion 21, and the detector output given out by the detector 24.

Based on the information from the control portion 26, the laser power control portion 4 sets the power to a level (for example, P0) that is considerably lower than the power for actually recording data. And based on the information from the control portion 26, the optical head 3 and the magnetic head 5 record the recording pattern in synchronization with the clock at the power set by the laser power control portion 4 on the optical disk 1, as shown in FIG. 3.

As shown in FIG. 3, the laser power control portion 4 lets the power change stepwise over a predetermined number of steps, with P0 as the initial value, based on the information from the control portion 26 (with the recording powers P0, P1, P2 . . . at these steps).

The recording pattern also is supplied to the detector 24.

FIG. 3 shows that the recording power increases monotonically, but there is no limitation to this, and it is also possible to let the recording power decrease monotonically, or to perform alternating increases and decreases.

After this recording pattern has been reproduced by the optical head 3 and input into the signal processor 21, and after the signal processor 21 has reduced low-frequency noise, a reproduction signal as shown in FIG. 3 is input into the detector 24. If the region for which Pmin has been detected is not a region on which nothing has been recorded so far, that is, if it is a region of the data recording region 13 that has already been recorded, then the reproduction signal includes signal components of data that had been recorded on that region before, in addition to the noise components caused by the optical disk 1 and the optical head 3.

The detector 24 detects the correlation between the recording pattern shown in FIG. 3 and the reproduction signal. This means simply that the auto-correlation is detected, whereby it is possible to determine precisely how the recording pattern has been recorded at the various recording powers. The result of this detection is then given as the correlation value to the minimum recording power detection portion 25.

Since substantially the same clock is used for the signal recording and reproduction, the signal components that are not correlated to the recording pattern, such as the noise components or previously recorded data, are canceled by taking the period when the recording pattern in FIG. 3 is a logical "H" as "1" and the period when the recording pattern is a logical "L" as "−1", taking the product of recording pattern and reproduction signal, and integrating it over a predetermined period of time. Therefore, it is possible to detect the signal components of recording patterns recorded on the optical disk 1 for very faint signals, and to detect them as correlation values with the detector 24.

The correlation value is obtained by dividing the integration result of each stage recorded at the same power in accordance with the integrated periods (t0, t1, t2 . . . ), like the detector output shown in FIG. 3, for example. Let C0, C1, C2 . . . be the correlation values detected at each stage. In regions in which the power is low and in which no recording has been carried out, the correlation value is about zero.

When it is clear that the integration periods (t0, t1, t2 . . . ) are the same at the various recording powers, then it is also possible to use the integration result directly as the correlation value without dividing it in accordance with the integration periods.

It is also possible to detect the correlation with the detector 24, taking the period when the recording pattern is a logical "H" as "−1" and the period when the recording pattern is a logical "L" as "1".

The minimum recording power detection portion 25 compares the correlation values with a predetermined level, and detects when the smaller of the two becomes larger than the other one. Then, the recording power with which that recording pattern was recorded (for example, P2 in FIG. 3) is detected from the address at that time, and Pmin is taken to be this recording power. Then, the control portion 26 multiplies Pmin by a certain factor (a recording compensating factor) to calculate the optimum recording power, and the laser power used to record data is set to this optimum recording power.

Thus, even when the data recording region 13 is taken as the region for detecting the minimum recording power for the optical disk 1, it is not necessary to previously delete all data recorded in that region, and it is possible to detect Pmin with high precision and in a short time. Furthermore, since faint signal components can be detected, it is possible to detect Pmin with a power that is considerably lower than the power for recording data near Pmin, so that there is no risk of cross-writing data on neighboring tracks during the detection of Pmin.

It is also possible to input the reproduction signal into the detector 24 after digitizing it with an A/D converter not shown in the drawings. Also in this case, the correlation can be detected with the detector 24 by taking the period when the recording pattern is a logical "H" as "1" and the period when the recording pattern is a logical "L" as "−1" or by taking the period when the recording pattern is a logical "H" as "−1" and the period when the recording pattern is a logical "L" as "1", multiplying the recording pattern by the digitized reproduction signal, and adding the multiplied values up for predetermined periods (for example, t0, t1, t2, . . . ).

Also, by detecting the continuity of the correlation values (C0, C1, C2 . . . ) when detecting Pmin with the minimum recording power detection portion 25, it is possible to prevent an erroneous detection of Pmin. For example, if the recording pattern is recorded changing the recording power from Pn−1 to Pn to Pn+1 (with Pn−1<Pn<Pn+1), and the correlation values detected for these are Cn−1, Cn and Cn+1, and if Cn>Cn+1 even though Cn−1<predetermined level<Cn, meaning that the formerly smaller value has become larger at the predetermined level, then there is the possibility that the value for Cn includes a detection error, so that Pn is not set to Pmin.

By detecting Pmin in a plurality of regions on the optical disk 1 to set the optimum recording power, it is possible to set an optimum recording power with respect to the disk sensitivity fluctuations, for example.

Figure 2B:
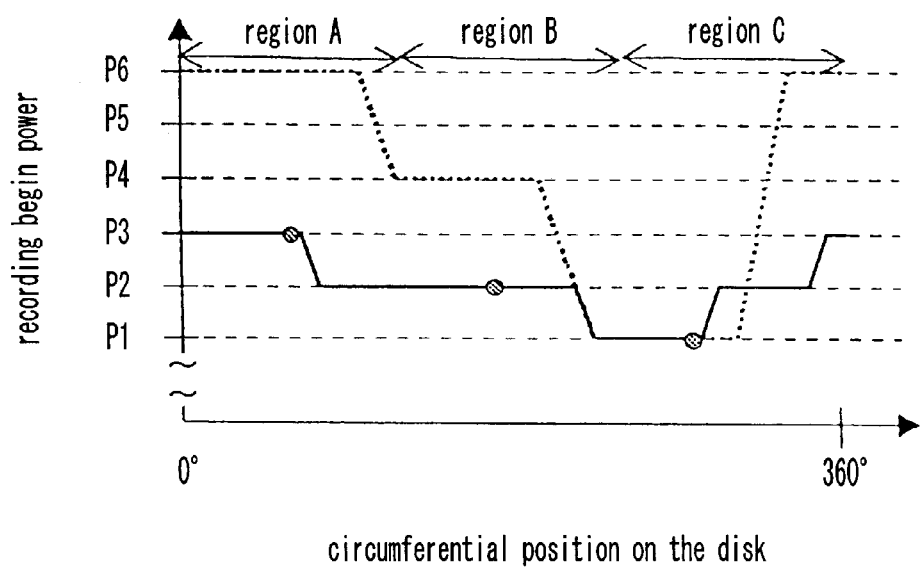
FIG. 2B is a graph illustrating how the recording begin power depends on the position in circumferential position of these optical disks.

Sometimes the optical disk 1 includes sensitivity fluctuations, so that Pmin varies within the same track 14, as shown by the solid line in FIG. 2B. In that case, the optimum recording power also varies depending on Pmin. In FIG. 2B, the horizontal axis represents the positions and regions on a circumference of the track 14, and the vertical axis represents the Pmin at each position. This occurs for example due to fluctuations in the thickness of the recording film 12. In thicker regions of the film, heat is transmitted less easily, and Pmin rises, because more heat is necessary, whereas Pmin drops in film thinner regions.

If the detection of Pmin is performed in region A, Pmin is detected to be P3, so that a high recording power is set for the region C, and there is the risk of cross-writing. Also, if the detection of Pmin is performed in region C, Pmin is detected to be P1, so that the region A is set to a recording power that is too low, and there is the risk that a sufficient signal quality cannot be attained.

Therefore, Pmin is detected in the regions A, B and C that result from partitioning one track on the optical disk 1 into a plurality of regions, and the detected values for those regions are denoted Pmin−A, Pmin−B and Pmin−C.

Considering the switching of the laser power within one track when recording data, the power control with the laser power control portion 4 and other controls, such as gain control, with the focus control portion and the tracking control portion (not shown in the drawings) become very complex, so that it is preferable to set the laser power to one common level in a plurality of regions.

Therefore, the average value of the detected values of Pmin (for example, Pmin−A, Pmin−B, and Pmin−C) in the plurality of regions is taken as the Pmin for the track 14, so that Pmin is detected to be a power level near P2, making it possible to set the optimum recording power.

It should be noted that it is also possible to determine the Pmin of the track 14 by taking not all of the detected values of Pmin (Pmin−A, Pmin−B, . . . ,Pmin−N) in the plurality of regions on the optical disk 1, but eliminating the maximum and/or the minimum and taking the average from the remaining values. Moreover, the determination of Pmin is not limited to taking the average, and also can be carried out by any other suitable method.

Furthermore, the number of regions per track for which Pmin is detected is not limited to three, and it also can be two or four or more. Also, the track 14 in FIG. 2A is shaped as a concentric circle, but there is no limitation to this, and it also can be spiral-shaped.

Furthermore, the regions for which Pmin is detected are not limited to the regions obtained by partitioning one track, and also can be the regions in the same radial direction on the optical disk 1, or any other suitable regions on the optical disk 1.

Thus, it is possible to set an optimum recording power when there are sensitivity fluctuations on the optical disk. Furthermore, by disregarding the maximum value for Pmin detected in a plurality of regions when detecting Pmin, it is possible to prevent the recording power from being set too high when Pmin is extremely high due to fingerprints or dust adhering to the disk. Also, by disregarding the maximum and/or the minimum value for Pmin detected in a plurality of regions when detecting Pmin, it is possible to prevent the setting of an erroneous recording power due to an erroneous detection of Pmin.

The sensitivity fluctuations on the optical disk 1 are not limited to fluctuations in the thickness of the recording film 12, and also can result from fluctuations in the thickness of other films not shown in the drawings or caused by other factors.

Also, when the detected values for Pmin lead to the conclusion that there is no suitable optimum recording power it is possible to prevent damage to the optical head 3 and cross-writing by interrupting the recording of data.

With poor focusing conditions of the light beam and at lower temperatures, a higher Pmin is detected, and accordingly, the recording power that is set as the optimum recording power by the control portion 26 is higher, too. However, when the output power is above a certain level, there is the possibility that the optical head 3 is damaged, so that if the detected Pmin is above a certain level, the control portion 26 concludes that there is no suitable recording power, and the recording of data is interrupted.

Furthermore, if Pmin is detected in a plurality of regions on the optical disk 1, and if a fluctuation among the plurality of detected values of Pmin is more than a predetermined fluctuation, then the control portion 26 concludes that there is no suitable recording power, and the recording of data is interrupted. This means, when the sensitivity fluctuations of the optical disk 1 are as indicated by the dotted line in FIG. 2B, then cross-writing may occur at the region C when recording with the optimum recording power for region A, and an adequate signal quality may not be obtained in region A when recording with the optimum recording power for region C.

Thus, it becomes possible to prevent the damage of the optical head 3 due to excessive laser output, as well as the recording of data at recording powers at which cross-writing may occur.

When detecting Pmin, it is possible to cancel DC components in the noise included in the reproduction signal by using a recording pattern, in which "0"s and "1"s appear with substantially the same frequency.

Due to fluctuations in the photoelectric conversion element (not shown in the drawings) in the optical head 3 and due to the offset in the electrical circuit (not shown in the drawings) in the signal processor 21, the reproduction signal may contain DC noise.

Now, if the "0"s and "1"s in the recording pattern appear at different frequencies, the correlation value is offset by this difference, resulting in a detection error. Therefore, by detecting the correlation value with a recording pattern, in which the "0"s and "1"s appear at substantially the same frequencies within the integration periods (for example, t0, t1, t2 . . . ) for the recording powers, the DC components in the reproduction signal are cancelled, and it is possible to obtain a correlation value with little detection error. Needless to say, this also increases the precision of Pmin, because the detection of Pmin is carried out with this correlation value.

Furthermore, if it is not possible to let the "0"s and "1"s appear at the same frequencies, for example if the number of data bits in the integration periods (for example, t0, t1, t2 . . . ) for the recording powers is an odd number, then a recording pattern should be used at which their frequencies are as uniform as possible.

The DC noise included in the reproduction signal is not limited to fluctuations of the photoelectric conversion element in the optical head 3 and the offset generated in the electrical circuit (not shown in the drawings) in the signal processor 21, but also can be caused by other factors.

Thus, it is possible to detect Pmin with higher precision.

When using recording patterns that differ for each detection of Pmin, it is not necessary to delete in advance the recording pattern recorded at the previous detection of Pmin for the same position (sector), and it becomes possible to detect Pmin several times.

This is the same as for the same reason as that it is not necessary to delete in advance the previously recorded data in the data recording region 13. That is to say, even when the reproduction signal includes a recording pattern (for example b0) recorded during the previous detection of Pmin, if there is no correlation between the recording pattern and b0, the signal components of b0 are cancelled by the detector 24, so that the detection of the recording pattern is possible.

For example, when detecting Pmin, it is possible to record a recording pattern that differs for each detection of Pmin by generating an M-sequence random pattern with an M-sequence generation circuit (not shown in the drawings), and inputting this random pattern into the control portion 26 to use it as the recording pattern.

Thus, even when different recording patterns are recorded for each detection of Pmin, and the recording patterns recorded during the detection of Pmin are not deleted, there is no need to then delete these patterns in advance when detecting Pmin at the same position (sector), and Pmin can be detected in any recordable region on the optical disk. Also, there is no need to delete the previously recorded data or recording patterns in advance, so that the detection of Pmin can be performed in a short time.

Second Embodiment

Figure 4:
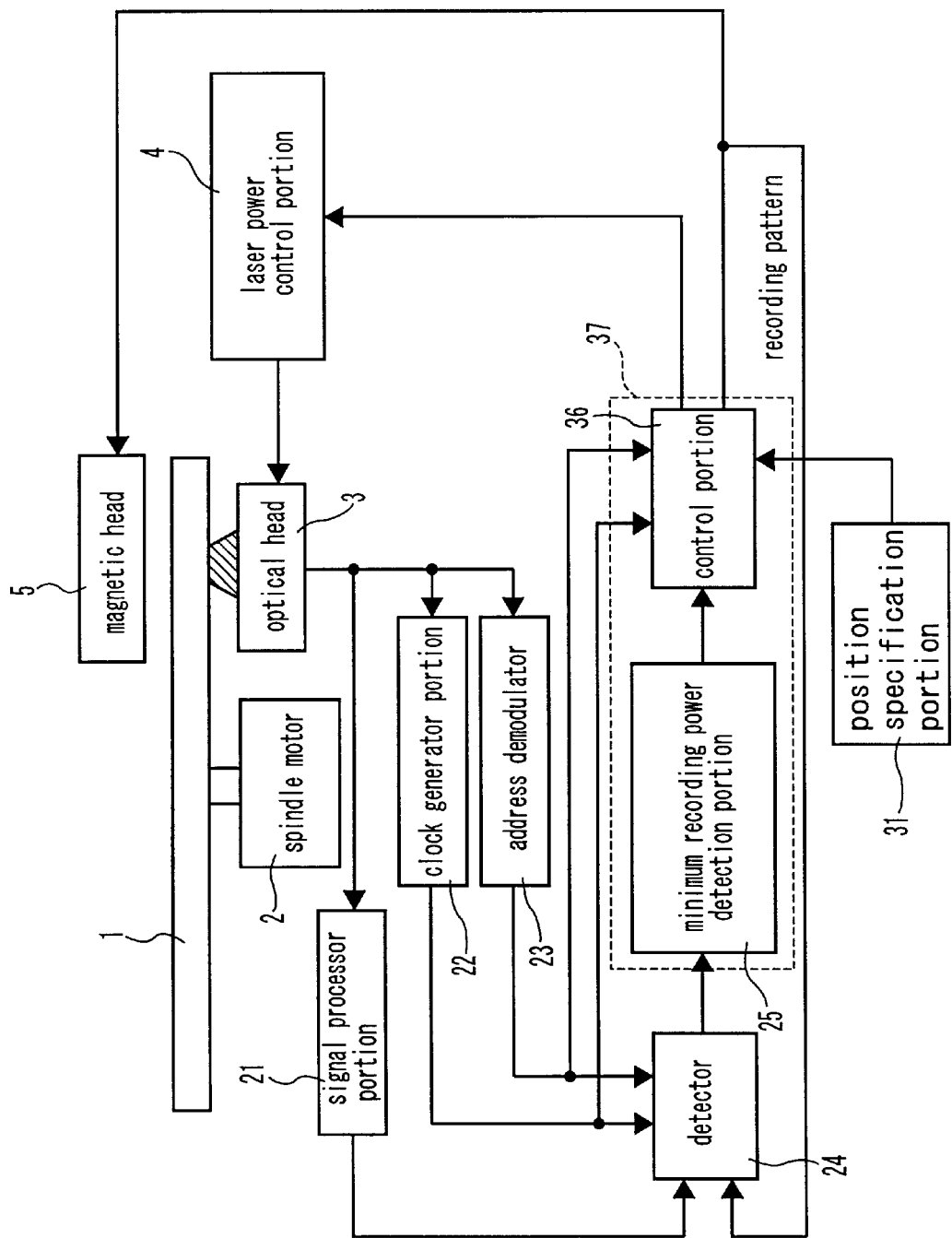
FIG. 4 is a block diagram illustrating the configuration of an optical disk apparatus according to the second embodiment of the present invention.

FIG. 4 is a block diagram illustrating the configuration of an optical disk apparatus according to the second embodiment of the present invention. In FIG. 4, structural elements that are the same as in FIG. 1 have been denoted by the same numerals, and their further description has been omitted.

In FIG. 4, numeral 25 denotes a minimum recording power detection portion for detecting Pmin, and numeral 36 denotes a control portion, which controls the spindle motor 2, the optical head 3, the laser power control portion 4, and the magnetic head 5, and sets the optimum recording power. The minimum recording power detection portion 25 and the control portion 36 constitute an optimum recording power setting portion 37. Numeral 31 denotes a position specification portion, which specifies a position on the optical disk 1 for which Pmin is detected.

The following is an explanation of the operation of an optical disk apparatus with this configuration.

The position specification portion 31 specifies the position on the optical disk for which Pmin is to be detected to the control portion 36. Consequently, the optimum recording power setting portion 37 performs the detection of Pmin at the specified position. Furthermore, the setting of the optimum recording power by the optimum recording power setting portion 37 is performed by letting the control portion 36 multiply the Pmin detected with the minimum recording power detection portion 25 by a certain factor (a recording compensating factor) to calculate the optimum recording power, and setting the laser power used to record data to this optimum recording power. The method for detecting Pmin with the minimum recording power detection portion 25 is the same as in the first embodiment.

It is possible that tilts and warping in the optical disk 1 differ depending on the position on the optical disk, and that the temperature at the optical disk surface changes over time. If the focusing condition of the light beam is changed due to tilting of the optical disk 1 or defocusing, the equivalent laser power used for recording and reproduction changes as well, so that Pmin and the optimum recording power change accordingly. Furthermore, Pmin and the optimum recording power depend strongly on the temperature at the surface of the disk.

Therefore, directly before the recording, the position specification portion 31 specifies the position (sector) of the data recording region 13 that is to be recorded next. The minimum recording power detection portion 25 detects the Pmin at this position (sector). Then, the control portion 36 multiplies this Pmin by the factor to calculate the optimum recording power, and the laser power used for the data recording is again set to this optimum recording power.

Thus, it is still possible to set an optimum recording power with the optimum recording power setting portion 37, when the focusing condition has changed with the position on the optical disk 1 or due to temporal changes, or when the temperature at the disk surface has changed.

There is no limitation to a detection of Pmin immediately prior to the recording of data, and it is also possible to let the position specification portion 31 specify a plurality of positions on the optical disk 1 (such as the innermost track or the outermost track) in advance, detect Pmin at these positions, and calculate the Pmins at the positions to which data are recorded by interpolation, using the Pmins at the previously detected positions.

Also in this case, it is possible to detect Pmin using the data recording region, so that there is no necessity to provide a predetermined region, such as a power setting region, on the optical disk 1.

Thus, an optimum recording power can be set for each position (sector) even when the focusing condition changes depending on the position on the optical disk 1.

Third Embodiment

Figure 5:
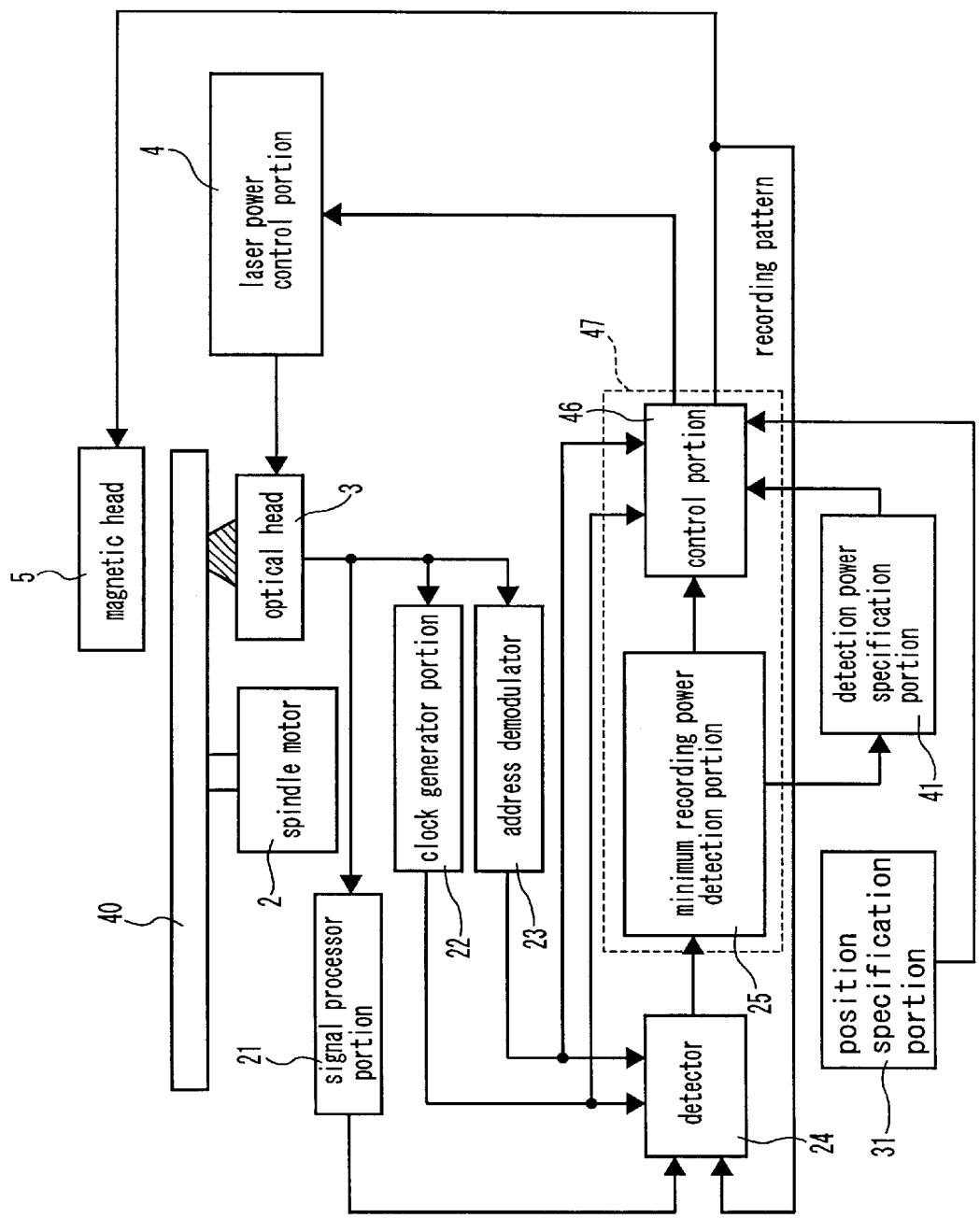
FIG. 5 is a block diagram illustrating the configuration of an optical disk apparatus according to the third embodiment of the present invention.

FIG. 5 is a block diagram illustrating the configuration of an optical disk apparatus according to the third embodiment of the present invention. In FIG. 5, structural elements that are the same as in FIG. 1 or FIG. 4 have been denoted by the same numerals, and their further description has been omitted.

In FIG. 5, numeral 40 denotes an optical disk having a power setting region that is provided separately from the data recording region. Numeral 25 denotes a minimum recording power detection portion for detecting Pmin, and numeral 46 denotes a control portion, which controls the spindle motor 2, the optical head 3, the laser power control portion 4, and the magnetic head 5, and sets the optimum recording power. The minimum recording power detection portion 25 and the control portion 46 constitute an optimum recording power setting portion 47. Numeral 41 denotes a detection power specification portion, which specifies the maximum laser power used for the detection of Pmin.

Figure 6:
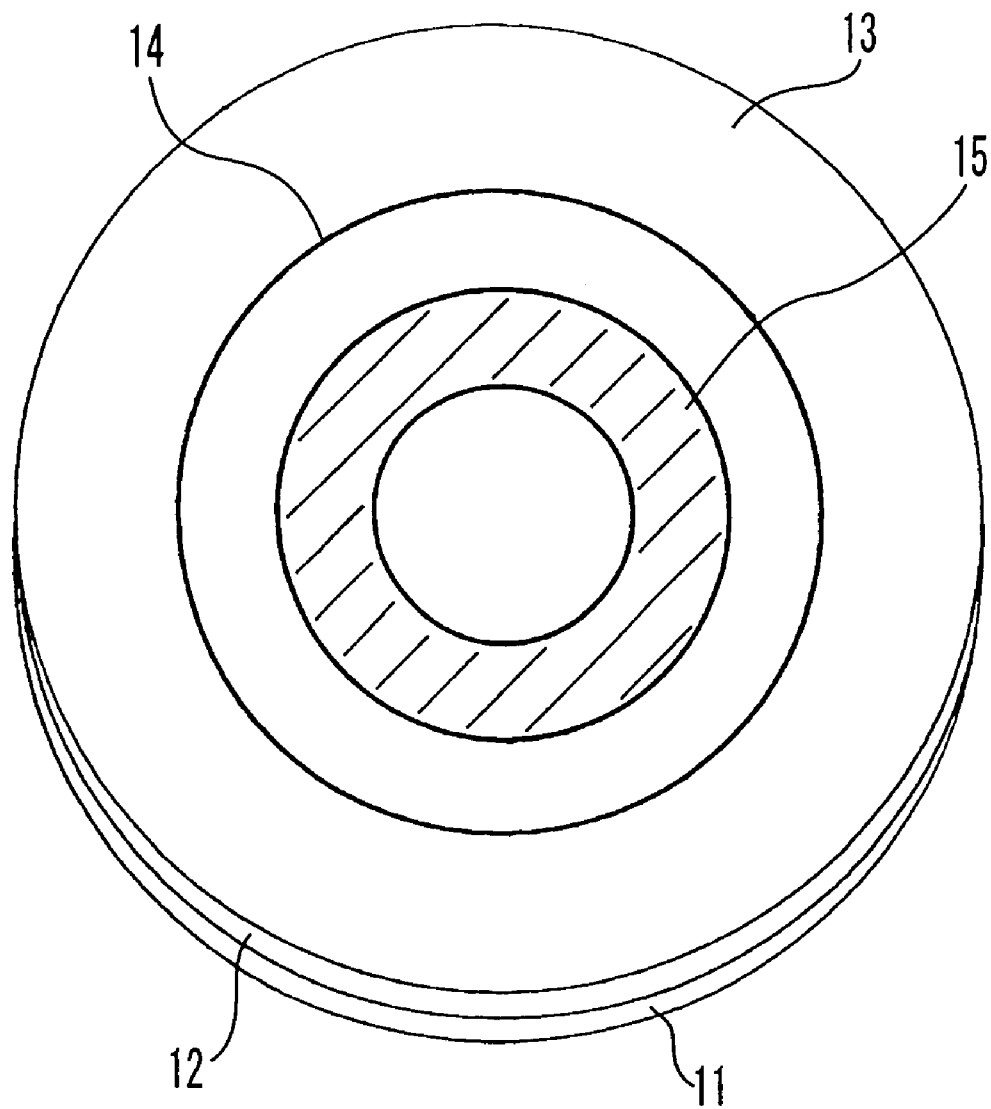
FIG. 6 illustrates the configuration of an optical disk in accordance with the third embodiment of the present invention.

FIG. 6 is a diagram illustrating the configuration of an optical disk 40 in accordance with the third embodiment of the present invention. In FIG. 6, structural elements that are the same as in FIG. 3 have been denoted by the same numerals, and their further description has been omitted.

In FIG. 6, numeral 15 denotes a power setting region for detecting the optimum power for recording and/or reproduction, which is provided on the optical disk 40.

The following is an explanation of the operation of an optical disk apparatus with this configuration.

Immediately after the optical disk 40 has been inserted, or when the apparatus has been reset by a system controller (not shown in the drawings) to a state that is the same as immediately after the insertion of a disk, the position specification portion 31 specifies a power setting region 15, and the optimum recording power setting portion 47 detects the Pmin for this region. The method for detecting Pmin is the same as in the first embodiment. Here, the detected Pmin is called Ptest.

The value of the detected Pmin (Ptest) is also input into the detection power specification portion 41, and the detection power specification portion 41 multiplies the received value of Pmin (Ptest) by a predetermined factor (thus obtaining Pa).

Then, immediately before recording data, the position specification portion 31 specifies those positions (sectors) of the data recording region 13 that are to be recorded next.

The detection power specification portion 41 specifies Pa as the maximum laser power used for the detection of Pmin to the control portion 46.

Based on the information from the control portion 46, the laser power control portion 4 sets a power (for example P0) that is considerably lower than the power for actually recording data. And based on the information from the control portion 46, the optical head 3 and the magnetic head 5 record the recording pattern in synchronization with the clock generated by the clock generator 22 at the power set by the laser power control portion 4 at the positions (sectors) specified by the position specification portion 31.

The laser power control portion 4 lets the recording power change over a predetermined number of steps, with P0 as the initial value, based on the information from the control portion 46, but such that the recording power does not become larger than the power Pa specified by the detection power specification portion 41.

Thus, the present embodiment differs from the first and the second embodiments in that a maximum value is set for the laser power used for the detection of Pmin.

The recording pattern also is supplied to the detector 24.

The signal obtained by reproducing the recording pattern with the optical head 3 is input into the signal processor 21, and after the signal processor 21 has eliminated low-frequency noise, a reproduction signal as shown in FIG. 3 is input into the detector 24. If the region for which Pmin has been detected is not a region on which nothing has been recorded so far, then the reproduction signal includes signal components of data that had been recorded on that region before, in addition to other noise components.

The detector 24 detects the correlation between the recording pattern and the reproduction signal. This means simply that the auto-correlation is detected, whereby it is possible to determine how precisely the recording pattern has been recorded at the various recording powers. The result of this detection is then input as the correlation value to the minimum recording power detection portion 25. The minimum recording power detection portion 25 compares the correlation values with a predetermined level, and detects when the smaller of the two becomes larger than the other one, whereupon the recording power with which that recording pattern was recorded is detected from the address at that time, and Pmin is taken to be this recording power. Then, the control portion 46 multiplies Pmin by a certain factor (a recording compensating factor) to calculate the optimum recording power, and the laser power used to record data is set to this optimum recording power.

Furthermore, if the correlation value at the maximum laser power Pa does not get above a predetermined level, the detection power specification portion 41 multiplies Pa yet again by a certain factor (resulting in Pb). Then, the detection power specification portion 41 specifies Pb as the maximum laser power used for the detection of Pmin to the control portion 46. This process is repeated and the detection power specification portion 41 sequentially increases the maximum laser power used for the detection of Pmin until Pmin is detected by the minimum recording power detection portion 25. It should be noted that if the maximum laser power specified by the detection power specification portion 41 reaches a predetermined level, the control portion 46 interrupts the recording of data.

In high-density disks with narrow track pitch, cross-writing during recording poses a problem. Therefore, when detecting Pmin in the data recording region 13, it is preferable to record the recording pattern at a power near Pmin that is as low as possible. Here, it is possible to prevent the recording at high laser powers and thus cross-writing during the detection of Pmin by taking Pmin detected in the power setting region 15, and taking Pmin multiplied by a factor as the maximum laser power used for detecting Pmin in the data recording region 13.

This is because, assuming that the temperature change of the disk slopes only gently after the optical disk 40 has been inserted and a predetermined time has passed, the Pmin detected at the data recording region 13 can be assumed not to diverge much from the Ptest detected previously at the power setting region 15. Therefore, it is possible to detect Pmin most efficiently while still preventing cross-writing by setting the maximum value of Pmin to a value Pa that is slightly larger than Ptest.

After detecting Pmin once in the data detection region 13, it is also possible to take this value as Ptest, set Pa again, and then use this value as the maximum value the next time when detecting Pmin in the data recording region 13.

If the correlation value for the maximum laser power Pa does not reach a predetermined level, it is preferable that, before detecting Pmin the next time in the data recording region 13, a power setting region 15 is specified again by the position specification portion 31 to detect Ptest, and Pa is set again by the detection power specification portion 41.

Thus, also in the data recording region, it is possible to prevent cross-writing and detect Pmin within a short time.

Fourth Embodiment

FIG. 7 is a block diagram illustrating the configuration of an optical disk apparatus according to the fourth embodiment of the present invention. In FIG. 7, structural elements that are the same as in FIG. 1 have been denoted by the same numerals, and their further description has been omitted.

In FIG. 7, numeral 25 denotes a minimum recording power detection portion for detecting Pmin, and numeral 56 denotes a control portion, which controls the spindle motor 2, the optical head 3, the laser power control portion 4, and the magnetic. head 5, and sets the optimum recording power. The minimum recording power detection portion 25 and the control portion 56 constitute an optimum recording power setting portion 57. Numeral 51 denotes a timing specification portion, which specifies the timing for performing the detection of Pmin.

The following is an explanation of the operation of an optical disk apparatus with this configuration.

The timing specification portion 51 detects temperature changes near the optical disk 1 and/or the time that has passed since detecting Pmin, and outputs a timing signal to the minimum recording power detection portion when necessary. The optimum recording power setting portion 57 carries out the detection of Pmin in response to this timing signal. Furthermore, the setting of the optimum recording power by the optimum recording power setting portion 57 is performed by letting the control portion 56 multiply the Pmin detected with the minimum recording power detection portion 25 by a certain factor (a recording compensating factor) to calculate the optimum recording power, and setting the laser power used to record data to this optimum recording power. The method for detecting Pmin with the minimum recording power setting portion is the same as in the first embodiment.

A thermistor (not shown in the drawings) can be used as a temperature detection means for detecting the temperature near the optical disk. Furthermore, a timer (not shown in the drawings) can be used as a time detection means for detecting the time that has passed after Pmin has been detected.

It is possible that the temperature at the surface of the optical disk changes with time. Since Pmin and the optimum recording power depend strongly on the temperature at the surface of the optical disk, it is preferable that when the temperature near the optical disk changes abruptly, Pmin is detected again, and the laser power used for recording data is set again.

The timing specification portion 51 detects temperature changes near the optical disk from the output by a temperature detection portion (not shown in the drawings), and outputs a timing signal if there is at least a predetermined amount of temperature change. This makes it possible to still set the optimum recording power, even when there are abrupt temperature changes.

It is also possible that the tilts and warping of the optical disk 1 differ with the position on the optical disk. If the focusing condition of the light beam changes due to tilting of the optical disk 1 or defocusing, then the equivalent laser power used for recording and reproduction changes as well, so that Pmin and the optimum recording power change accordingly. Therefore, it is preferable that Pmin is detected periodically and the laser power used for recording data is newly set.

The timing specification portion 51 detects the time that has passed since detecting Pmin from the output by the time detection portion (not shown in the drawings), and outputs a timing signal if at least a predetermined amount of time has passed. This makes it possible to set the optimum recording power periodically.

The detection of Pmin in the present invention as described above is possible without having to delete beforehand data that are recorded in the data recording region 13, so that Pmin can be detected in an extremely short time. That is to say, the rotational delay occurring when data are deleted becomes unnecessary, and there is no need to shift the optical head 3 and the magnetic head 5 to a predetermined region, such as a power setting region, provided on the optical disk, so that it becomes possible to set the optimum recording power very efficiently and without exerting a large influence on the operation of the system, even when Pmin is detected frequently at the timing specified by the timing specification portion 51.

It should be noted that the first to fourth embodiments have been explained for the case that the minimum recording power that can be recorded is detected, but similarly, it is also possible to change the magnetic field or the linear speed to detect the minimum magnetic field or the minimum linear speed at which reproducible recording marks can be formed on the optical disk.

Fifth Embodiment

As explained in the first to fourth embodiments, the optimum recording power is set to the power value that is obtained by multiplying the detected minimum recording power Pmin by a certain factor.

Figure 8B:
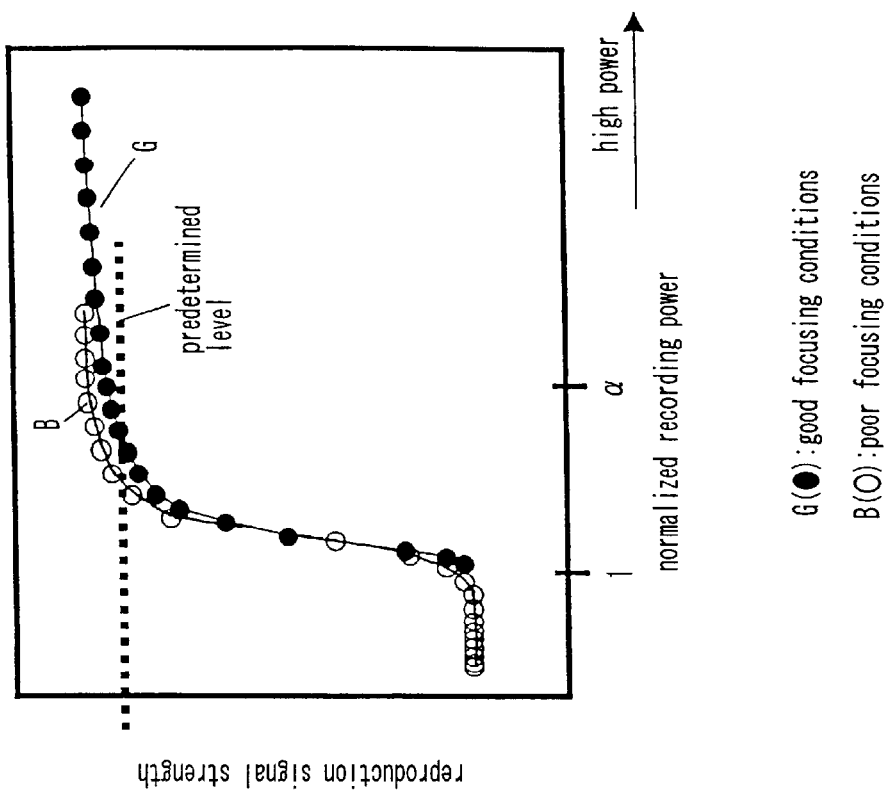
FIGS. 8A and 8B are graphs illustrating how the regeneration signal strength depends on the recording power when changing the focusing condition.
Figure 8A:
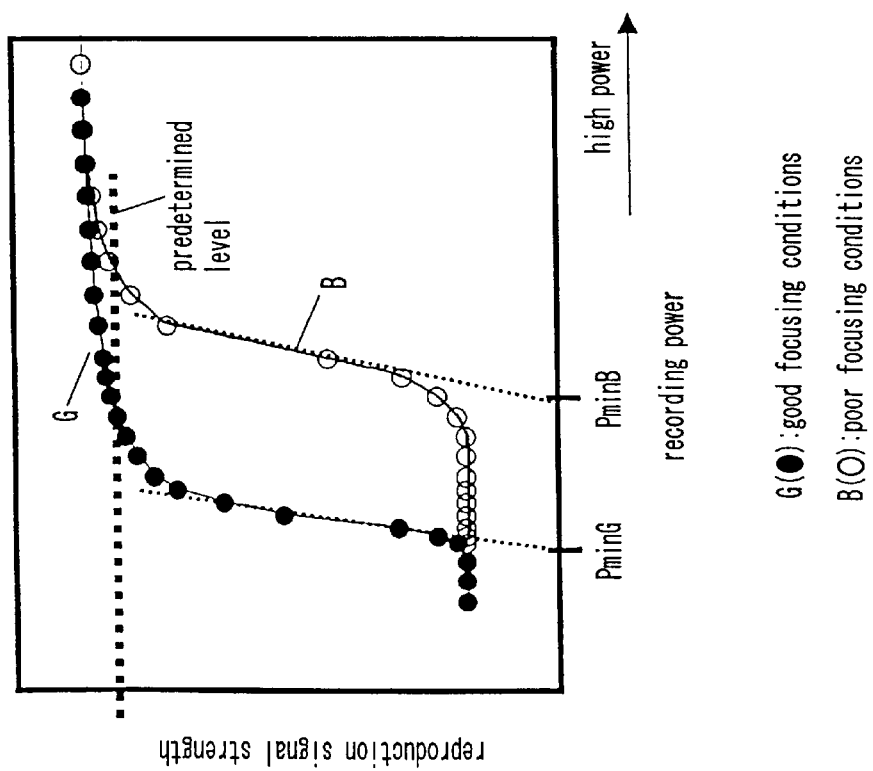

FIG. 8A shows an example of the dependency of the reproduction signal strength on the recording power for recordings that have been performed under different focusing conditions of the light beam. In FIG. 8A, curve G illustrates the dependency of the reproduction signal strength on the recording power for a recording performed under good focusing conditions of the light beam, and curve B illustrates the dependency of the reproduction signal strength on the recording power for a recording performed under poor focusing conditions of the light beam. As shown in FIG. 8A, the recording power that is necessary to obtain the same reproduction signal strength, for example a reproduction signal strength of a predetermined level, differs greatly with the focusing of the light beam.

By detecting the minimum recording powers for these focusing conditions and normalizing them with the respective minimum recording power (PminG and PminB), the normalized recording power dependency shown in FIG. 8B is obtained. That is to say, by recording at a recording power that is normalized to Pmin regardless of the focusing condition (referred to in short as "normalized recording power" in the following), it is possible to obtain a substantially constant reproduction signal strength.

Consequently, by recording at a power ($\alpha \cdot Pmin$) that is obtained by multiplying the minimum recording power by a constant factor $\alpha$, it becomes possible to preserve a constant recorded signal strength, when the focusing conditions of the light beam change. The value of $\alpha$ should be such that a signal strength of at least a predetermined level is obtained.

However, with this configuration, it was sometimes not possible to set the optimum recording power for a high-density disk provided with a narrower track pitch.

As the density of the optical disk is increased and the track pitch is made narrower, the risk increases that the data on neighboring tracks is corrupted during recording (this effect is also called "cross-writing" in the following). The reason for this is that cross-writing is caused by propagation of heat to the neighboring tracks (thermal diffusion), and as the track pitch becomes narrower, the influence exerted on the neighboring tracks becomes greater.

Figure 9:
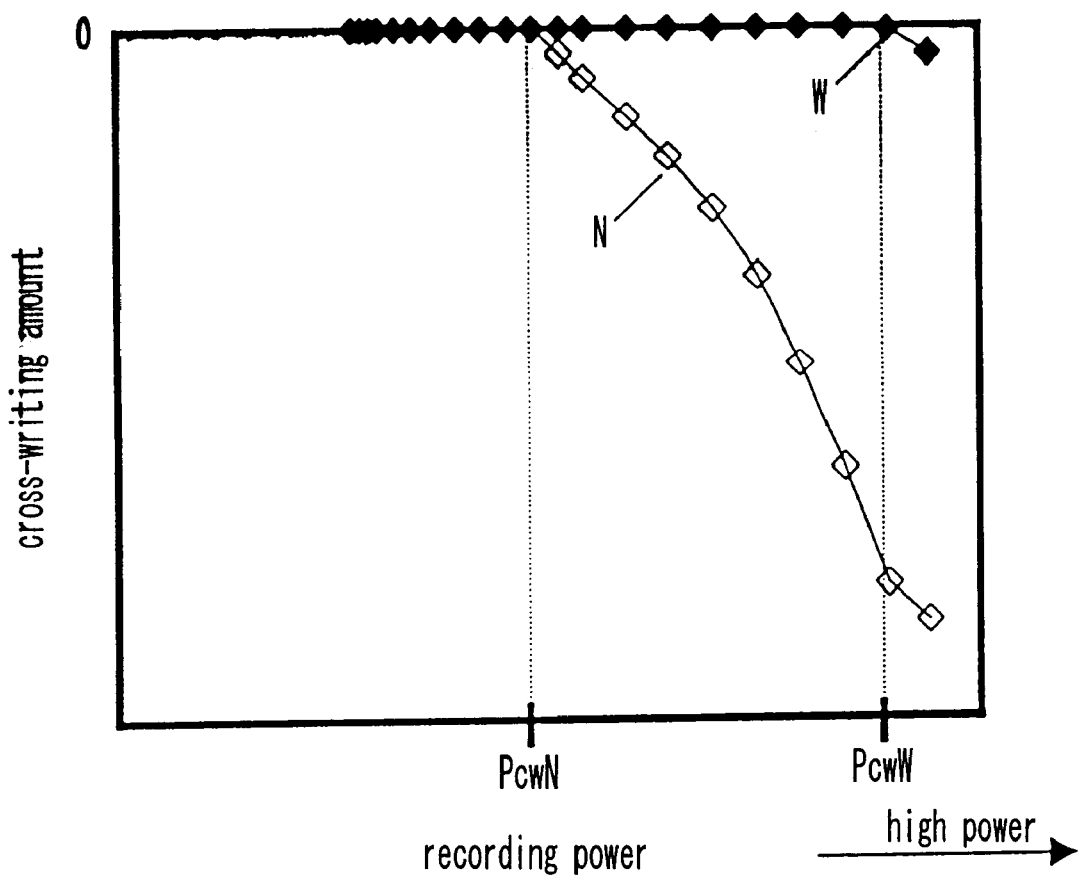
FIG. 9 is a graph illustrating how the cross-writing amount depends on the recording power when changing the track pitch.

FIG. 9 illustrates how the cross-writing amount changes with the track pitch. In FIG. 9, the cross-writing amount is represented by the amount by which the signal strength of the neighboring tracks is decreased as a result of the recording on the desired track. In FIG. 9, curve W is an example of the dependency of the cross-writing amount on the recording power when the track pitch is wide, and curve N is an example obtained when the track pitch is narrow. The minimum recording power at which cross-writing occurs (referred to in short as "cross-writing begin power" or "Pcw" in the following) becomes lower as the track pitch becomes narrower (PcwN<PcwW).

When cross-writing occurs, then the data on the neighboring tracks is corrupted, and in the worst case, the data in the corrupted portions may be lost or impossible to reproduce. Therefore, it is preferable that in high-density disks, the recording power is set not only such that a signal of at least a predetermined level can be recorded on the desired track, but also taking into consideration of cross-writing.

Figure 10B:
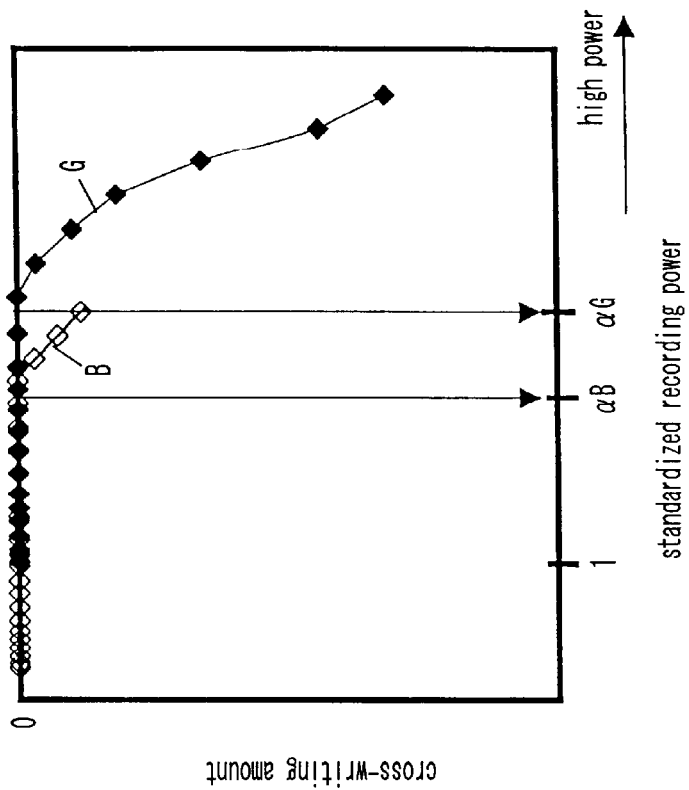
FIG. 10 is a graph illustrating how the cross-writing amount depends on the recording power when changing the focusing condition.
Figure 10A:
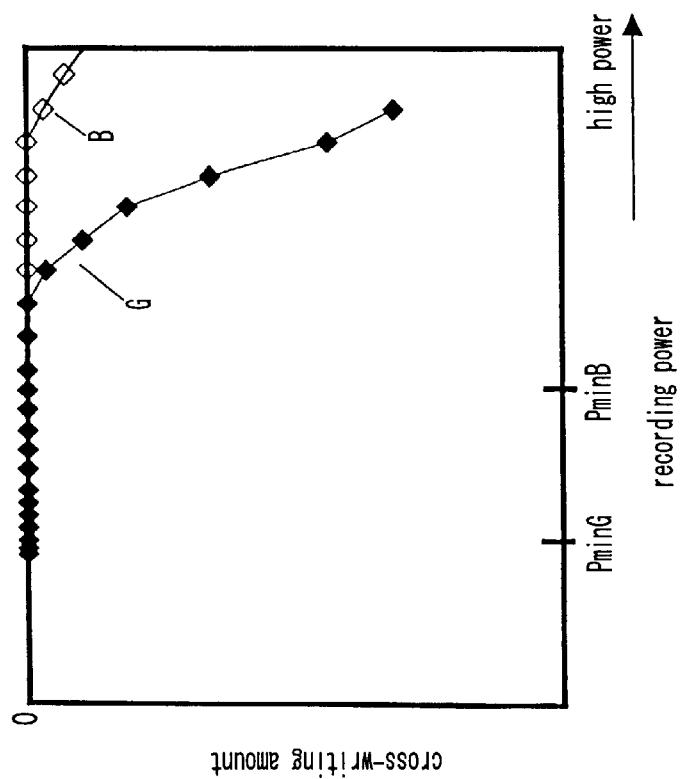

As explained above, cross-writing is caused by the propagation of heat to neighboring tracks (thermal diffusion), so that the influence of the focusing condition of the light beam on the recording power dependency differs from the reproduction signal strength shown in FIGS. 8A and 8B. For example, when the focusing condition changes as shown in FIG. 8A, the dependency of the cross-writing amount on the recording power is as shown in FIG. 10A. When normalizing with the minimum recording powers for the respective focusing conditions (PminG and PminB), the normalized recording power dependency shown in FIG. 10B is obtained, and as the focusing of the light beam becomes poorer, cross-writing occurs already at lower normalized recording powers.

Generally, it is preferable to record with high laser powers in a range at which no cross-writing occurs, so as to achieve a recording with high reliability. Thus, by setting the laser power used for recording data to $\alpha G \cdot PminG$ when the focusing condition of the light beam is good, and setting the laser power to $\alpha B \cdot PminB$ when the focusing condition of the light beam is poor, it is possible to record on high-density disks with high reliability and considerably reduce the risk of cross-writing leading to the corruption of data on the neighboring tracks during recording.

Furthermore, Pmin changes also depending on such conditions as temperature of the optical disk and linear speed at writing time. Also in this case, setting the laser power used for the recording of data to a suitable value obtained by multiplying Pmin by a factor in accordance with the recording conditions makes it possible to prevent cross-writing and achieve a recording with high reliability.

Therefore, the optical disk apparatus of the fifth embodiment has a configuration with which the factor (a recording compensating factor) by which the minimum recording power is multiplied when setting the laser power used for the recording of data (optimum recording power) can be set to an optimum value that depends on such parameters as the focusing condition of the light beam at recording time. The following is an explanation of the configuration of an optical disk apparatus according to the fifth embodiment.

Figure 11:
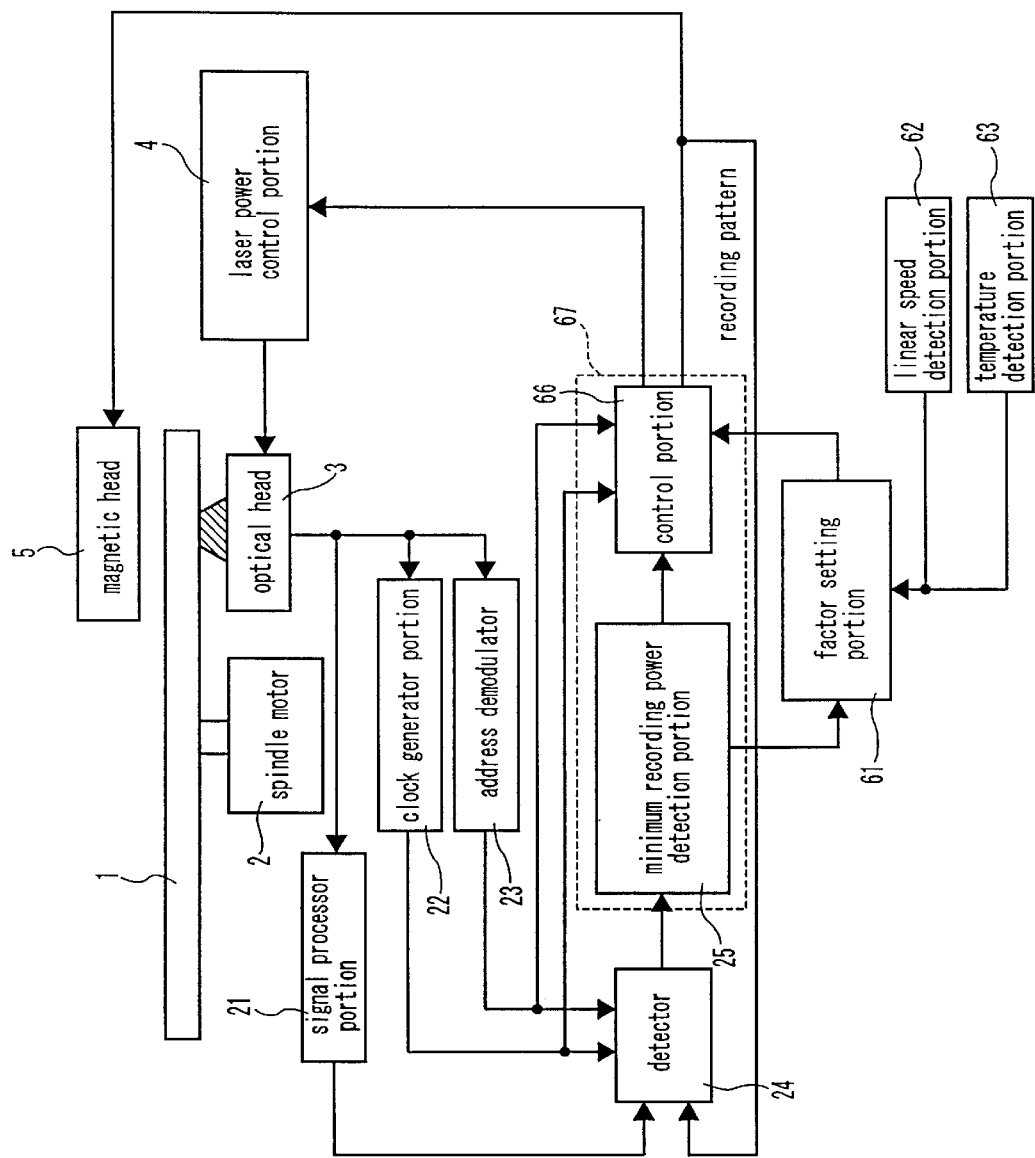
FIG. 11 is a block diagram illustrating the configuration of an optical disk apparatus according to the fifth embodiment of the present invention.

FIG. 11 is a block diagram illustrating the configuration of an optical disk apparatus according to the fifth embodiment of the present invention. In FIG. 11, structural elements that are the same as in FIGS. 1, 4, 5 or 7 have been denoted by the same numerals, and their further description has been omitted.

In FIG. 11, numeral 66 denotes a control portion, which controls the spindle motor 2, the optical head 3, the laser power control portion 4, and the magnetic head 5, and sets the optimum recording power. This control portion 66 and the minimum recording power detection portion 25 constitute an optimum recording power setting portion 67. Numeral 61 denotes a factor setting portion for setting the value of the factor by which the minimum recording power is multiplied to set the optimum recording power, numeral 62 is a linear speed detection portion, which detects the linear speed of the optical disk 1, and numeral 63 denotes a temperature detection portion, which detects the temperature near the optical disk 1.

The following is an explanation of the operation of an optical disk apparatus with this configuration.

The method for detecting the minimum recording power is the same as in the first embodiment, so that its further explanation has been omitted.

The linear speed of the optical disk 1 is detected with the linear speed detection portion 62, and the result of this detection is input into the factor setting portion 61. Furthermore, the temperature near the optical disk 1 is detected with the temperature detection portion 63, and the result of this detection is also input into the factor setting portion 61.

As a means for detecting the linear speed of the optical disk 1, it is possible to use the control information of the spindle motor 2, for example. And as a means for detecting the temperature near the optical disk 1, it is possible to use a thermistor, for example.

The factor setting portion 61 sets the value of the factor, by which Pmin is multiplied to set the optimum recording power, in accordance with the linear speed of the optical disk 1, the temperature near the optical disk 1, and/or the focusing condition of the optical beam, and this adjusted value $\alpha'$ is input into the control portion 66. Also, as will be explained in more detail below, the factor setting portion 61 determines the focusing condition of the light beam from Pmin.

In the method for detecting the minimum recording power as explained for the first embodiment, the factor by which Pmin is multiplied when setting the laser power used for the recording of data (that is, the optimum recording power) was set to a constant $\alpha$, but the optical disk apparatus of this embodiment is characterized in that it is set to a variable $\alpha'$ that depends on such parameters at recording time as the focusing condition of the light beam.

Referring to the FIGS. 12 to 15, the following is an explanation of the operation of the factor setting portion 61 and the method for setting the factor $\alpha'$ by which the minimum recording power is multiplied.

Figures 12A, 12B:
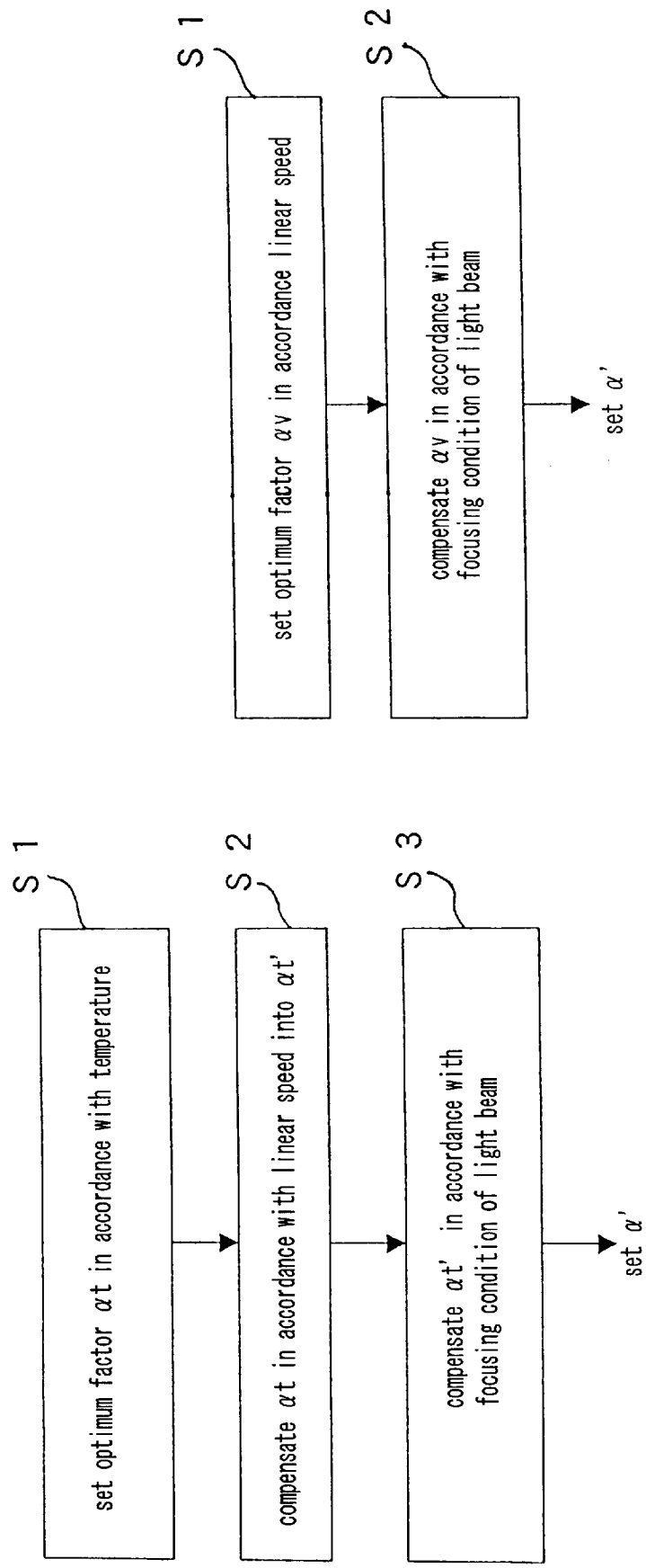
FIGS. 12A and 12B are examples of flowcharts illustrating methods for controlling the recording power in accordance with the fifth embodiment of the present invention.

FIG. 12A and FIG. 12B are examples of flowcharts illustrating methods for controlling the recording power in the optical disk apparatus of this embodiment, and show specific methods for setting the factor $\alpha'$ by which the minimum recording power is multiplied.

FIG. 12A is a first example of a flowchart illustrating a method for controlling the recording power. In Step 1 (S1) in this first example, the factor setting portion 61 sets the optimum factor $\alpha t$ in accordance with the temperature of the optical disk 1.

In general, when data are recorded on the optical disk 1, a light beam is irradiated on a desired track of the optical disk 1, and the temperature of the recording film 12 in the optical disk 1 is increased to a predetermined temperature (for example, the Curie temperature in the case of optomagnetic recording), thereby recording the data. When Tr denotes the temperature of the optical disk 1 when no light beam is irradiated, Tc denotes the Curie temperature of the recording film 12, k denotes the laser power necessary for increasing the temperature of the recording film to by a unit temperature, then the recording starts when the temperature of the optical disk 1 is Tc, which can be expressed as $$k=Pmin/(Tc-Tr). \qquad \text{Equation 1}$$

Herein, it is assumed that the temperature of the optical disk 1 is substantially the same as the temperature of the recording film 12 in the optical disk 1.

When Pwt is the optimum recording power, and Twt denotes the temperature of the optical disk 1 when a light beam is irradiated at this laser power, then k can be expressed as $$k=Pwt/(Twt-Tr). \qquad \text{Equation 2}$$

Combining Equation 1 with Equation 2 gives $$k=Pmin/(Tc-Tr)=Pwt/(Twt-Tr),$$

which can be rearranged to $$Pwt/Pmin=(Twt-Tr)/(Tc-Tr). \qquad \text{Equation 3}$$

Figures 13A, 13B:
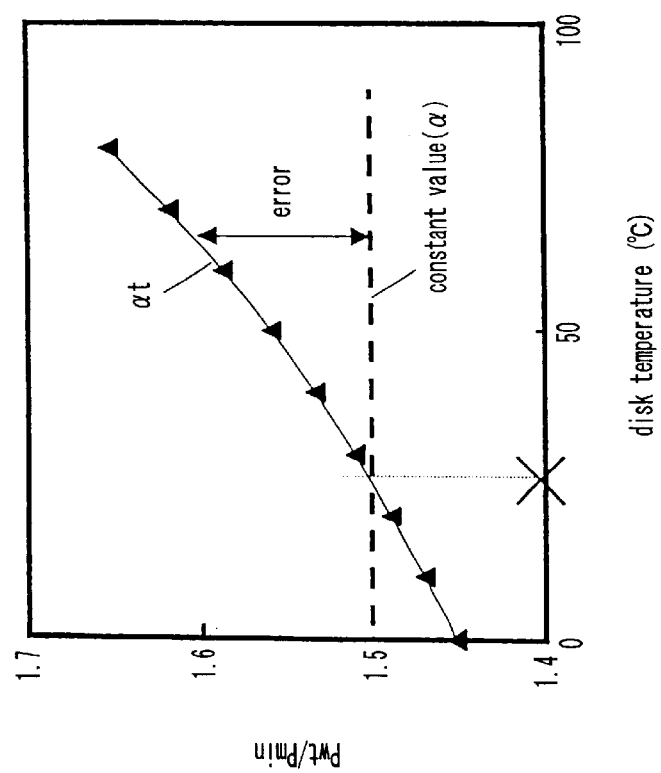
FIG. 13A is a graph illustrating how the ratio between the minimum recording power and the optimum recording power depends on the disk temperature.
FIG. 13B is a correspondence table of disk temperature ranges and the optimum factors for these ranges.

In Equation 3, Twt and Tc are values that are particular to the disk, and in common optical disks, Twt is 240 to 450° C, whereas Tc is about 160 to 300° C. Thus, in a disk in which Twt is for example 380° C and Tc is 260° C, the value of Pwt/Pmin changes as shown in FIG. 13A, depending on the temperature Tr of the optical disk 1 when no light beam is irradiated.

Here, Pwt/Pmin is the ratio of the optimum recording power to the minimum recording power, which is of course the optimum factor, in accordance with the temperature of the optical disk 1, by which the minimum recording power is multiplied when setting the laser power used for the recording of data (optimum recording power). That is to say, if the laser power for that recording of data is set with a constant factor α (for example at 1.5 in FIG. 13A), and the optical disk 1 has a temperature different from a predetermined temperature (marked by the "×" in FIG. 13A) corresponding to this constant, then the recording power is set with a certain error.

In order to avoid this, the temperature Tr of the optical disk 1 is detected from the temperature near the optical disk 1, and the factor setting portion 61 sets the optimum factor αt for each temperature using the Equation 3.

The values for Twt and Tc can be stored in a predetermined area, such as the read-in area, of the optical disk 1, but they also can be stored in the optical disk apparatus itself, for example in the control portion 66 or in the factor setting portion 61.

It should be noted that the method for setting the optimum factor αt in accordance with the temperature of the optical disk 1 is not limited to determining this optimum factor from Equation 3, and it is also possible to set the optimum factor αt using a table that lists certain temperature ranges and the corresponding optimum factors for those temperature ranges. In that case, if the detected temperature Ttest near the optical disk 1 satisfies the equation minimum temperature TminN<Ttest<maximum temperature TmaxN, then the factor is set to αtN. Also in this case, the correspondence table of FIG. 13B can be stored in a predetermined area of the optical disk 1, or in the optical disk apparatus itself.

Thus, it becomes possible to set the recording power in accordance with the temperature of the optical disk 1. That is to say, compared to the case of multiplying the minimum recording power by a constant value regardless of the temperature, it can be prevented that the recording is performed at recording powers that are higher than the optimum recording power at low temperatures, thereby decreasing the risk of cross-writing. Furthermore, the recording at recording powers that are lower than the optimum recording power at high temperatures also can be prevented, thereby making it possible to record with higher reliability.

When there is the chance that the difference between the temperature near the optical disk 1 and the actual temperature of the optical disk 1 is large, such as directly after inserting the disk, then there is the risk that αt is set to the wrong factor, so that in this case, it is preferable not to perform the setting in accordance with temperature, but to set αt to a predetermined value (referred to as αt0) or to set the factor α' according to the flowchart in FIG. 12B explained below.

The method for detecting the temperature of the optical disk 1 is not limited to detecting it from the temperature near the optical disk 1, and using a temperature sensor, it is also possible to detect the temperature of the optical disk 1 directly.

In Step 2 (S2) of FIG. 12A, the factor setting portion 61 performs a compensation of at in accordance with the linear speed of the optical disk 1. Here, the αt after the compensation is referred to as αt'.

Figures 14A, 14B:
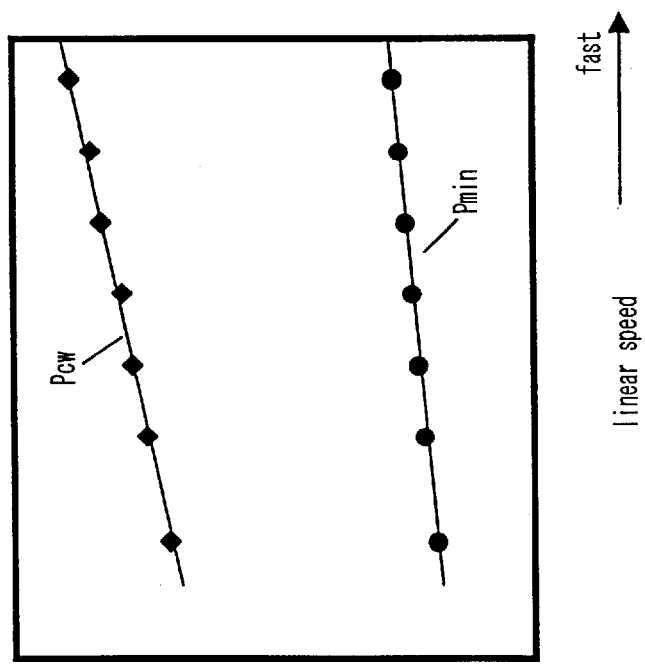
FIG. 14A illustrates how the recording power depends on the linear speed.
FIG. 14B is a correspondence table of linear speed ranges and the optimum factors for these ranges.

FIG. 14A illustrates how Pmin and Pcw change depending on the linear speed of the optical disk 1.

As mentioned above, data is recorded on the optical disk 1 by irradiating a light beam on the desired track of the optical disk 1, and raising the temperature of the recording film 12 in the optical disk 1 to a predetermined temperature, for example the Curie temperature.

Now, when the linear speed of the optical disk 1 increases, the energy of the light beam irradiated on a certain region decreases, so that the laser power that is necessary to raise the temperature of the optical disk 1 to the predetermined temperature increases. As a result, when the linear speed of the optical disk 1 rises, Pmin increases, and similarly, when the linear speed of the optical disk 1 drops, Pmin decreases. For example, when the linear speed increases by a factor m, Pmin increases by a factor ($\sqrt[4]{m}$).

On the other hand, cross-writing occurs due to the propagation of heat (thermal diffusion) to the neighboring tracks, so that Pcw is more strongly influenced by the linear speed of the optical disk 1 than Pmin. For example, when the linear speed of the optical disk 1 drops, heat accumulates in the recording film 12, and thermal diffusion to neighboring tracks tends to occur more easily. Therefore, when the linear speed increases by a factor m and Pmin increases by a factor ($\sqrt[4]{m}$), Pcw increases by a factor ($\sqrt[3]{m}$), for example.

Thus, the factor setting portion 61 calculates the ratio (referred to as "m" here) between the actual linear speed of the optical disk 1 and a predetermined linear speed (referred to as "v0" here), and if the linear speed is faster than the predetermined linear speed (m>1), the factor αt is compensated and made accordingly larger, and conversely, if the linear speed is slower than the predetermined linear speed (m<1), the factor αt is compensated and made accordingly smaller.

Let n_Pmin denote the ratio between the change of Pmin and the linear speed, and let n_Pcw denote the ratio between the change of Pcw and the linear speed, wherein n_Pmin and n_Pcw are functions of m. n_Pmin and n_Pcw are values that are particular to the optical disk 1 and/or the optical head 3. Therefore, the ratio (m) between the detected linear speed of the optical disk 1 and the predetermined linear speed v0 is calculated, and using this value, αt is compensated according to the following Equation 4, taking the result as αt':

$$\alpha t' = \alpha t \times (n\_Pcw/n\_Pmin) \qquad \text{Equation 4}$$

If, for example, n_Pmin=$\sqrt[4]{m}$ and n_Pcw=$\sqrt[3]{m}$, and the linear speed of the optical disk 1 increases by a factor 1.5, then Equation 4 yields $$\alpha t' = \alpha t \times (\sqrt[3]{1.5}/\sqrt[4]{1.5}) \approx 1.03 \cdot \alpha t.$$

Thus, it becomes possible to set the recording power in accordance with the linear speed of the optical disk 1. That is to say, compared to the case of multiplying the minimum recording power by a constant value regardless of the linear speed, it can be prevented that the recording is performed at recording powers that are lower than the optimum recording power at high linear speeds, thereby making it possible to record with higher reliability. Furthermore, the recording at recording powers that are higher than the optimum recording power at low linear speeds also can be prevented, thereby decreasing the risk of cross-writing.

Here, the functions of n_Pmin and n_Pcw or the coefficients of these functions can be stored in a predetermined area of the optical disk 1, such as the read-in area, but they also can be stored in the optical disk apparatus itself, for example in the control portion 66 or in the factor setting portion 61. Furthermore, instead of the individual coefficients n_Pmin and n_Pcw, it is also possible to store their quotient n_Pmin/n_Pcw.

Also the predetermined linear speed v0 can be stored in a predetermined area of the optical disk 1, or in the optical disk apparatus itself.

Next, in Step 3 (S3) of FIG. 12A, the factor setting portion 61 performs a compensation of αt' in accordance with the focusing condition of the light beam. Then, the compensated factor αt' is input into the control portion 66 as the factor α' by which the minimum laser power is multiplied when setting the laser power used for the recording of data.

As an example of the change of the focusing condition of the light beam, FIG. 15 illustrates how Pmin and Pcw change depending on the radial tilt resulting when the optical disk 1 tilts in radial direction with respect to the optical head 3.

When the focusing condition of the light beam has worsened due to defocusing or tilting of the disk, the equivalent laser power drops, so that Pmin increases. In this case, Pcw increases as well, but due to the poorer focusing condition, the laser spot of the light beam is deformed, and thermal diffusion to the neighboring tracks tends to occur more easily. Especially in the case of radial tilting, thermal diffusion to the neighboring tracks becomes large. Therefore, the change of Pcw due to an increase in radial tilting (worsening of the focusing condition of the light beam) is smaller than that of Pmin.

For radial tilting (with a tilt amount of RT), when Pmin changes according to $$Pmin = c\_Pmin \cdot RT^2 + Pmin0, \qquad \text{Equation 5}$$

Pcw changes according to $$Pcw = c\_Pcw \cdot RT^2 + Pcw0, \qquad \text{Equation 6}$$

wherein c_Pcw<c_Pmin.

In these equations, Pmin0 and Pcw0 are the Pmin and the Pcw when the optical disk is at a predetermined temperature Tr0 and moves at a predetermined linear speed v0, and the focusing conditions of the light beam are good. Furthermore, c_Pmin and c_Pcw indicate the ratio of change of Pmin and Pcw with respect to the focusing conditions.

Therefore, the factor setting portion 61 detects the focusing conditions of the light beam from the detected Pmin, and if the focusing conditions are poor, it compensates and increases the factor αt' accordingly.

For example, if it is known beforehand that radial tilting is the main cause for poorer focusing conditions, then the focusing condition of the light beam can be carried out by using the Pmin detected with the minimum recording power detection portion 25 and the Pmin for good focusing conditions (which is referred to as Pmin0").

Pmin0" can be calculated by compensating Pmin0 in accordance with the temperature near the optical disk 1 and the linear speed at the time Pmin is detected.

First, using Equation 1, Pmin0 is compensated into Pmin0' in accordance with the temperature Tr near the optical disk:

$$Pmin0' = k(Tc-Tr) = Pmin0 \cdot (Tc-Tr0)/(Tc-Tr)$$

Then, Pmin0' is compensated into Pmin0" in accordance with the ratio m between the actual linear speed and the predetermined linear speed v0:

$$Pmin0" = \sqrt[4]{m} \cdot Pmin0' = \sqrt[4]{m} \cdot Pmin0 \cdot (Tc-Tr0)/(Tc-Tr)$$

By replacing the Pmin0 in Equation 5 with this calculated Pmin0", it is possible to calculate the tilt amount RT.

Then, αt' is compensated according to the following Equation 7, thus yielding α':

$$\alpha' = \alpha t' \times \{(c\_Pcw \cdot RT^2 + Pcw0)/Pcw0\}/\{(c\_Pmin \cdot RT^2 + Pmin0)/Pmin0\} \qquad \text{Equation 7}$$

If, for example, c_Pmin=0.009, c_Pcw=0.003, Pmin0=6 mW, Pcw=9 mW, and if RT=10 mrad, then Equation 7 yields α'=0.90·αt'.

Thus, it becomes possible to set a recording power that is suitable for the focusing condition of the light beam. That is to say, compared to the case of multiplying the minimum recording power by a constant value regardless of the focusing condition of the light beam, the recording at recording powers that are higher than the optimum recording power at poor focusing conditions can be prevented, thereby decreasing the risk of cross-writing.

It should be noted that the method for detecting the focusing condition of the light beam is not limited to a detection based on Pmin, and it also can be detected using a tilt amount detection portion provided separately.

Furthermore, it is also possible to compensate αt' in accordance with Pmin when the main cause for poorer focusing conditions is not known. For example, a compensation according to the following Equation 8 is possible:

$$\alpha' = \alpha t' \times (Pmin0"/Pmin) \qquad \text{Equation 8}$$

As the focusing condition worsens, Pmin rises, so that according to Equation 8, α' becomes smaller. Therefore, this also prevents recording at a recording power that is higher than the optimum recording power, and decreases the risk of cross-writing.

Here, the values for c_Pmin, Pmin0, c_Pcw and Pcw0 can be stored in a predetermined area of the optical disk 1, such as the read-in area, but they also can be stored in the optical disk apparatus itself, for example in the control portion 66 or in the factor setting portion 61.

Also the predetermined temperature Tr0 can be stored in a predetermined area of the optical disk 1, or in the optical disk apparatus itself The control portion 66 sets the laser power used for the recording of data to the optimum recording power ($\alpha'\cdot$Pmin), which is obtained by multiplying the Pmin detected with the minimum recording power detection power 25 by the factor $\alpha'$ that has been set by the factor setting portion 61.

Thus, when setting the laser power used for the recording of data (optimum recording power), it is possible to set the factor that is multiplied by the minimum recording power to an optimum value in accordance with such parameters as the focusing condition of the light beam during recording. By setting the laser power used for the recording of data using this value, cross-writing can be prevented, and recording with a higher reliability becomes possible.

Note that FIG. 12A shows an example in which the factor $\alpha'$ that is multiplied by the minimum recording power changes depending on the focusing condition of the light beam, the linear speed of the optical disk 1, and the temperature of the optical disk 1, but it is not necessary to use all these detected values to set $\alpha'$, and it is also possible to use any one or any combination of those values. This means it is possible to perform the setting or compensation with any one of the steps S1 to S3 in FIG. 12A, and it is also possible to perform the setting or compensation with any combination of the steps S1 to S3 in FIG. 12A. Note that if there is no setting in accordance with temperature (S1) in FIG. 12A, then at is set to a predetermined value $\alpha t0$.

Also, if there is no setting in accordance with temperature near the optical disk 1 (S1) in FIG. 12A, then it is also possible to set the factor $\alpha'$ with the flowchart shown in FIG. 12B.

FIG. 12B is a second example of a flowchart illustrating a method for controlling the recording power in accordance with the present invention.

First, in Step 1 (S1) of FIG. 12B, the factor setting portion 61 sets an optimum factor $\alpha v$ in accordance with the linear speed of the optical disk 1.

The optimum factor $\alpha v$ for the linear speed of the optical disk 1 can be set using a table as shown in FIG. 14B, listing linear speed ranges and the optimum factors corresponding to these ranges. For example, if the detected linear speed Vtest satisfies the equation minimum linear speed VminN<Vtest<maximum linear speed VmaxN, then the factor is set to $\alpha vN$.

In Step 2 (S2) of FIG. 12B, the factor setting portion 61 performs a compensation of $\alpha v$ in accordance with the focusing condition of the light beam. Then, the compensated factor $\alpha v$ is input into the control portion 66 as the factor $\alpha'$ by which the minimum recording power is multiplied when setting the laser power used for the recording of data (optimum recording power).

The compensation of the factor in accordance with the focusing condition of the light beam is the same as in Step S3 in FIG. 12A, so that its further explanation has been omitted.

The correspondence table of FIG. 14B can be stored in a predetermined area of the optical disk 1, such as the read-in area, but it also can be stored in the optical disk apparatus itself, for example in the control portion 66 or in the factor setting portion 61.

Note that FIG. 12B shows an example in which the factor $\alpha'$ that is multiplied by the minimum recording power changes depending on the focusing condition of the light beam and the linear speed of the optical disk 1, but it is not necessary to use both these detected values to set $\alpha'$, and it is also possible to use any one of those values. This means it is possible to perform the setting or compensation with only one of the Steps S1 and S2 in FIG. 12B. Note that if the setting in accordance with linear speed (S1) in FIG. 12B is not performed, then $\alpha v$ is set to a predetermined value $\alpha v0$.

Thus, in addition to the effect attained by the optical disk apparatus of the first embodiment, it is possible to set the factor that is multiplied by the minimum recording power to an optimum value in accordance with such parameters as recording time as the focusing condition of the light beam when setting the laser power that is used for the recording of data (optimum recording power), so that the advantageous effects of preventing cross-writing and making recordings with higher reliability possible are attained by using this value to set the laser power for the recording of data.

The optical disk apparatus of this embodiment includes a factor setting portion 61, a linear speed detection portion 62, and a temperature detection portion 63 in addition to the configuration of the optical disk apparatus of the first embodiment, but the same advantageous effect can be attained if it includes the factor setting portion 61, the linear speed detection portion 62, and the temperature detection portion 63 in addition to the configuration of the optical disk apparatus of the second to fourth embodiments.

Sixth Embodiment

FIG. 16 is a block diagram illustrating the configuration of an optical disk apparatus according to the sixth embodiment of the present invention. In FIG. 16, structural elements that are the same as in FIGS. 1, 4, 5, 7 and 11 have been denoted by the same numerals, and their further description has been omitted.

In FIG. 16, numeral 76 denotes a control portion, which controls the spindle motor 2, the optical head 3, the laser power control portion 4, and the magnetic head 5, and sets the optimum recording power. The control portion 76 and the minimum recording power detection portion 25 constitute an optimum recording power setting portion 77. Numeral 71 denotes a factor setting portion, which sets the value of the factor (a recording compensating factor) by which the minimum recording power is multiplied when setting the optimum recording power, and numeral 72 denotes an intermittency ratio detection portion detecting the intermittency ratio of the light beam, which is irradiated intermittently at least during recording.

The following is an explanation of the operation of an optical disk apparatus according to the sixth embodiment having this configuration.

As in the optical disk apparatus of the first embodiment, the minimum recording power detection portion 25 detects Pmin, which is then input into the factor setting portion 71 and the control portion 76.

The intermittency ratio detection portion 72 detects the intermittency ratio of the intermittently irradiated light beam and inputs the detection result to the factor setting portion 71. The intermittency ratio is stored for example in the factor setting portion 71 or the control portion 76 in the optical disk apparatus.

The factor setting portion 71 sets the value of the factor, by which the minimum recording power is multiplied when setting the optimum recording power, in accordance with the intermittency ratio of the light beam, and inputs this adjusted value $\alpha'$ to the control portion 76.

To reduce the power consumption of the optical head 3 and to reduce fluctuations of the recording mark positions formed on the optical disk 1, a recording method has been proposed in which the light beam is irradiated intermittently during recording.

Figure 17B:
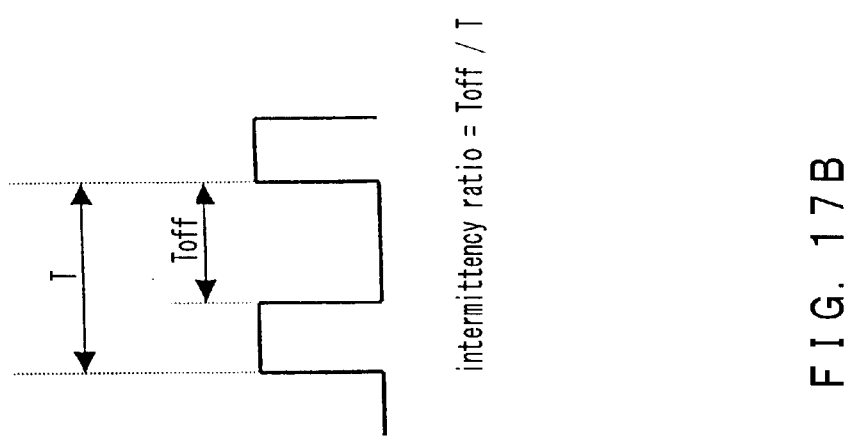
FIG. 17B is a diagram explaining the intermittency ratio.
Figure 17A:
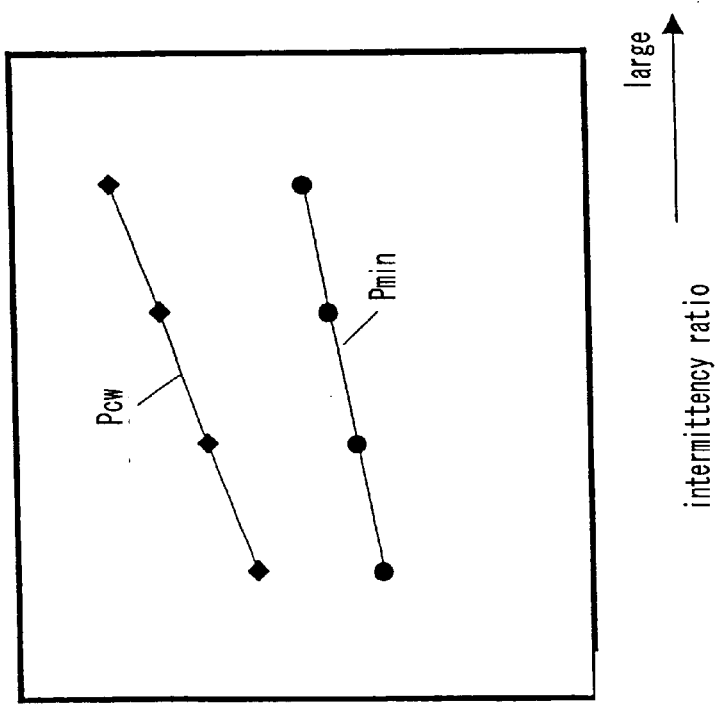
FIG. 17A illustrates how the recording power depends on the intermittency ratio.
Figure 18:
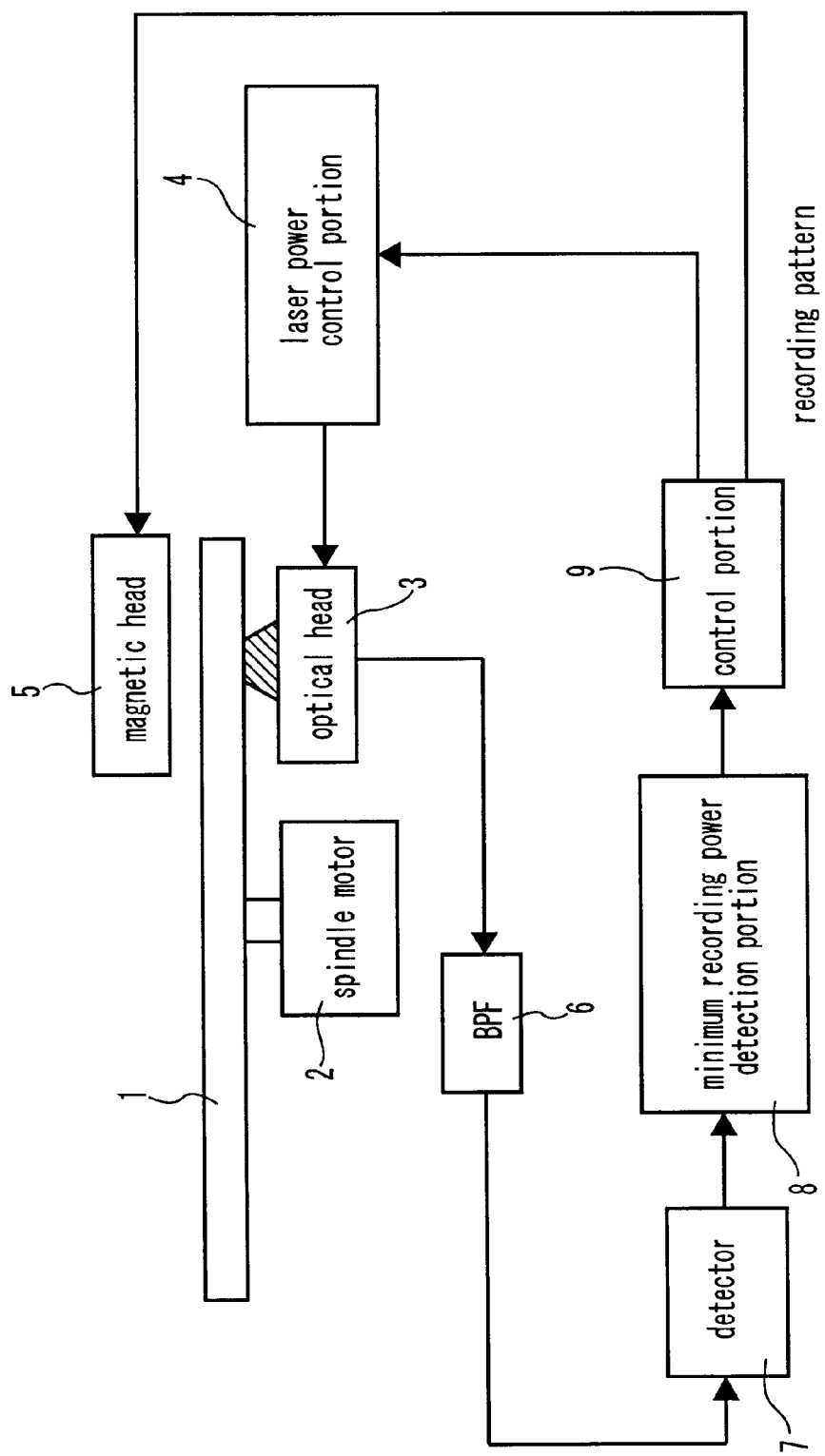
FIG. 18 is a block diagram illustrating the configuration of a conventional optical disk apparatus.
Figure 19:
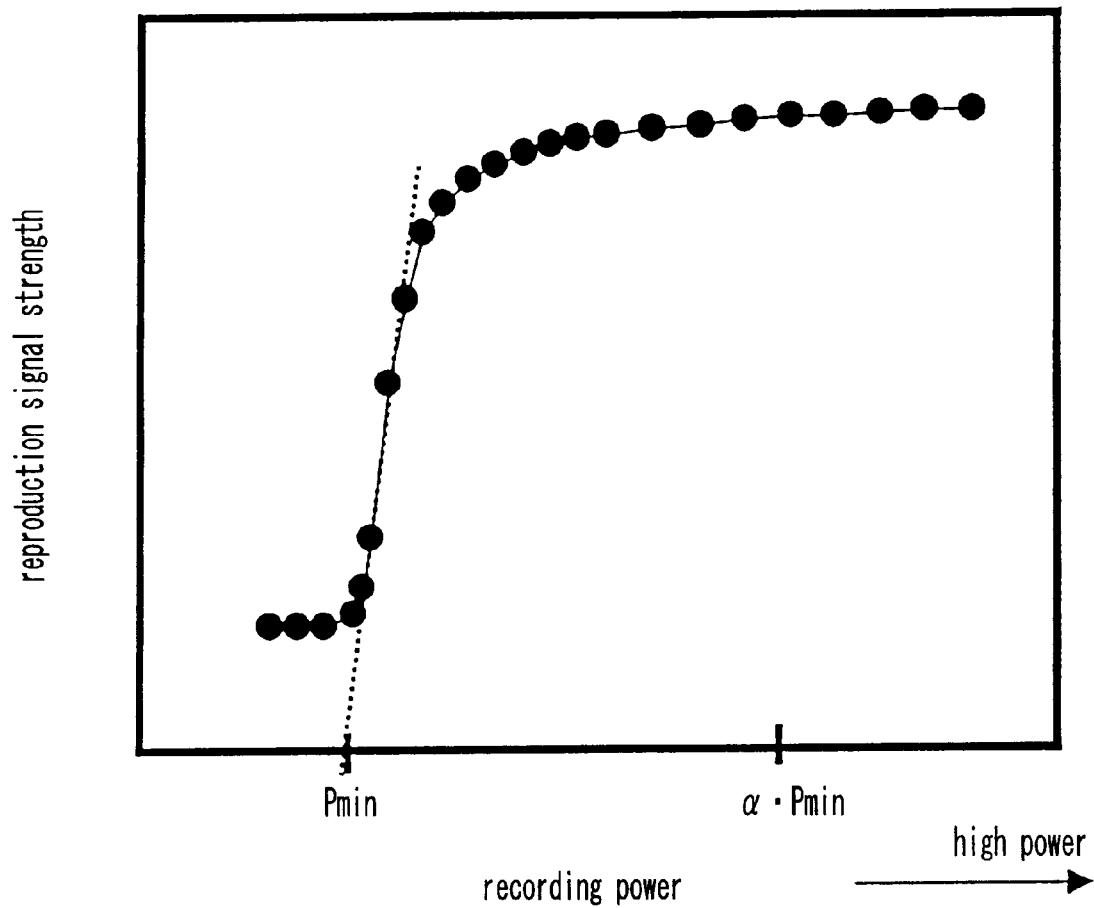
FIG. 19 illustrates how the reproduction signal strength depends on the recording power.

FIG. 17A illustrates how Pmin and Pcw change depending on the intermittency ratio of the light beam. As illustrated in FIG. 17B, the intermittency ratio of the light beam is the ratio of the time Toff, in which no laser light is irradiated, to the period T of the irradiation pulse. The vertical axis in FIG. 17A marks the pulse height (recording power) of the pulse-shaped irradiated light beam.

When the intermittency ratio of the light beam is large, the time in which no light beam is irradiated becomes long, so that the energy of the light beam that is irradiated on a certain area decreases. Consequently, a larger laser power is necessary to raise the temperature of the optical disk 1 to the predetermined temperature, and Pmin increases.

On the other hand, cross-writing is caused by the propagation of heat (thermal diffusion) to the neighboring tracks so that the intermittency ratio of the light beam exerts a larger influence on Pcw than on Pmin. For example, when the intermittency ratio of the light beam becomes small, heat accumulates in the recording film 12, and thermal diffusion to the neighboring tracks tends to occur more easily.

Therefore, the factor setting portion compares the actual intermittency ratio of the light beam with a predetermined intermittency ratio g0, and if the actual intermittency ratio is larger than the predetermined intermittency ratio go, it compensates and increases the factor accordingly. Conversely, if the actual intermittency ratio is smaller than the predetermined intermittency ratio, it compensates and decreases the factor accordingly. For example, a compensation according to the following Equation 9 is possible:

$$\alpha' = \alpha 0 \times (\text{detected intermittency ratio}/g0) \quad \text{Equation 8}$$

In this equation, $\alpha 0$ is the factor by which Pmin is multiplied to set the laser power used for the recording of data (optimum recording power) at the predetermined temperature, the predetermined linear speed, the predetermined focusing condition, and the predetermined intermittency ratio.

As the intermittency ratio of the light beam decreases, the $\alpha'$ according to Equation 9 decreases as well, so that it is possible to prevent recording at a recording power that is higher than the optimum recording power, and to decrease the risk of cross-writing.

The values of $\alpha 0$ and $g0$ can be stored in a predetermined area of the optical disk 1, such as the read-in area.

Thus, it becomes possible to set the factor by which the minimum recording power is multiplied when setting the laser power used for the recording of data (optimum recording power) to an optimum value in accordance with the intermittency ratio of the light beam.

The optical disk apparatus of this embodiment includes a factor setting portion 71 and an intermittency ratio detection portion 72 in addition to the configuration of the optical disk apparatus of the first embodiment, but the same advantageous effects can be attained if it includes the factor setting portion 71 and an intermittency ratio detection portion 72 in addition to the configuration of the optical disk apparatus of the second to fourth embodiments.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An optical disk apparatus for recording and reproducing data by irradiating a light beam onto an optical disk, comprising:
   a recording portion for recording information on the optical disk;
   a laser power control portion for controlling a laser power of the recording portion;
   a reproduction portion for reproducing information recorded on the optical disk;
   a correlation detection portion for detecting a correlation between a recording pattern to be recorded on the optical disk by the recording portion and a reproduction signal obtained when the recording pattern is reproduced by the reproduction portion; and
   an optimum recording power setting portion which detects a minimum recording power at which reproducible recording marks are formed on the optical disk, and sets an optimum recording power to a power obtained by multiplying this minimum recording power by a recording compensating factor;
   wherein the optimum recording power setting portion compares a predetermined level with an output by the correlation detection portion that is obtained when the laser power is changed stepwise by the laser power control portion, detects as the minimum recording power the recording power when the originally smaller of the predetermined level and that output by the correlation detection portion becomes larger than the other, and sets the optimum recording power.

2. The optical disk apparatus according to claim 1, wherein the optimum recording power setting portion detects the minimum recording power in a plurality of regions on the optical disk, and sets a common optimum recording power for this plurality of regions.

3. The optical disk apparatus according to claim 2, wherein the recording of data is interrupted if the optimum recording power setting portion determines, based on the detected minimum recording power, that no suitable optimum recording power exists.

4. The optical disk apparatus according to claim 1, wherein the recording of data is interrupted if the optimum recording power setting portion determines, based on the detected minimum recording power, that no suitable optimum recording power exists.

5. The optical disk apparatus according to claim 1, wherein the recording portion records a recording pattern in which the frequency of "0"s and "1"s when detecting the minimum recording power is substantially equal.

6. The optical disk apparatus according to claim 1, wherein the recording portion records a different recording pattern each time the minimum recording power is detected.

7. The optical disk apparatus according to claim 1, further including a factor setting portion for setting the value of said recording compensating factor.

8. The optical disk apparatus according to claim 7, wherein the factor setting portion sets the value of said recording compensating factor in accordance with a temperature of the optical disk.

9. The optical disk apparatus according to claim 7, wherein the factor setting portion sets the value of said recording compensating factor in accordance with a linear speed of the optical disk.

10. The optical disk apparatus according to claim 7, wherein the factor setting portion sets the value of said recording compensating factor in accordance with a focusing condition of the light beam.

11. The optical disk apparatus according to claim 10, wherein the focusing condition of the light beam is determined from the minimum recording power at which reproducible recording marks are formed.

12. The optical disk apparatus according to claim 7,
wherein the optical disk apparatus records data by irradiating the light beam intermittently; and
wherein the factor setting portion sets the value of said recording compensating factor in accordance with an intermittency ratio of the light beam.

13. An optical disk apparatus for recording and reproducing data by irradiating a light beam onto an optical disk, comprising:
a recording portion for recording information on the optical disk;
a laser power control portion for controlling a laser power of the recording portion;
a reproduction portion for reproducing information recorded on the optical disk;
a correlation detection portion for detecting a correlation between a recording pattern to be recorded on the optical disk by the recording portion and a reproduction signal obtained when the recording pattern is reproduced by the reproduction portion;
an optimum recording power setting portion which detects a minimum recording power at which reproducible recording marks are formed on the optical disk, and sets an optimum recording power to a power obtained by multiplying this minimum recording power by a recording compensating factor; and
a position specification portion for specifying a position on the optical disk where the minimum recording power is detected;
wherein the optimum recording power setting portion compares a predetermined level with an output by the correlation detection portion that is obtained when the laser power at the position specified by the position specification portion is changed stepwise by the laser power control portion, detects as the minimum recording power the recording power when the originally smaller of the predetermined level and that output by the correlation detection portion becomes larger than the other, and sets the optimum recording power.

14. The optical disk apparatus according to claim 13, wherein the position specification portion specifies a data recording region.

15. The optical disk apparatus according to claim 13, further including a factor setting portion for setting the value of said recording compensating factor.

16. The optical disk apparatus according to claim 15, wherein the factor setting portion sets the value of said recording compensating factor in accordance with a temperature of the optical disk.

17. The optical disk apparatus according to claim 15, wherein the factor setting portion sets the value of said recording compensating factor in accordance with a linear speed of the optical disk.

18. The optical disk apparatus according to claim 15, wherein the factor setting portion sets the value of said recording compensating factor in accordance with a focusing condition of the light beam.

19. The optical disk apparatus according to claim 18, wherein the focusing condition of the light beam is determined from the minimum recording power at which reproducible recording marks are formed.

20. The optical disk apparatus according to claim 15,
wherein the optical disk apparatus records data by irradiating the light beam intermittently; and
wherein the factor setting portion sets the value of said recording compensating factor in accordance with an intermittency ratio of the light beam.

21. An optical disk apparatus for recording and reproducing data by irradiating a light beam onto an optical disk having a power setting region provided separately from a data recording region, the optical disk apparatus comprising:
a recording portion for recording information on the optical disk;
a laser power control portion for controlling a laser power of the recording portion;
a reproduction portion for reproducing information recorded on the optical disk;
a correlation detection portion for detecting a correlation between a recording pattern to be recorded on the optical disk by the recording portion and a reproduction signal obtained when the recording pattern is reproduced by the reproduction portion;
an optimum recording power setting portion which detects a minimum recording power at which reproducible recording marks are formed on the optical disk, and sets an optimum recording power to a power obtained by multiplying this minimum recording power by a recording compensating factor;
a position specification portion for specifying a position on the optical disk where the minimum recording power is detected; and
a detection power specification portion, which specifies a maximum laser power used for detecting the minimum recording power;
wherein the position specification portion specifies the power setting region before the data recording region, and the optimum recording power setting portion compares a predetermined level with an output by the correlation detection portion that is obtained when the laser power at the position specified by the position specification portion is changed stepwise by the laser power control portion, detects as the minimum recording power the recording power when the originally smaller of the predetermined level and that output by the correlation detection portion becomes larger than the other, sets the optimum recording power to that recording power, inputs the detected minimum recording power into the detection power specification portion, and determines the maximum laser power.

22. The optical disk apparatus according to claim 21, further including a factor setting portion for setting the value of said recording compensating factor.

23. The optical disk apparatus according to claim 22, wherein the factor setting portion sets the value of said recording compensating factor in accordance with a temperature of the optical disk.

24. The optical disk apparatus according to claim 22, wherein the factor setting portion sets the value of said recording compensating factor in accordance with a linear speed of the optical disk.

25. The optical disk apparatus according to claim 22, wherein the factor setting portion sets the value of said recording compensating factor in accordance with a focusing condition of the light beam.

26. The optical disk apparatus according to claim 25, wherein the focusing condition of the light beam is determined from the minimum recording power at which reproducible recording marks are formed.

27. The optical disk apparatus according to claim 22,
wherein the optical disk apparatus records data by irradiating the light beam intermittently; and
wherein the factor setting portion sets the value of said recording compensating factor in accordance with an intermittency ratio of the light beam.

28. An optical disk apparatus for recording and reproducing data by irradiating a light beam onto an optical disk, comprising:
a recording portion for recording information on the optical disk;
a laser power control portion for controlling a laser power of the recording portion;
a reproduction portion for reproducing information recorded on the optical disk;
a correlation detection portion for detecting a correlation between a recording pattern to be recorded on the optical disk by the recording portion and a reproduction signal obtained when the recording pattern is reproduced by the reproduction portion;
an optimum recording power setting portion which detects a minimum recording power at which reproducible recording marks are formed on the optical disk, and sets an optimum recording power to a power obtained by multiplying this minimum recording power by a recording compensating factor; and
a timing specification portion specifying a timing for detecting the minimum recording power;
wherein the optimum recording power setting portion compares a predetermined level with an output by the correlation detection portion that is obtained when the laser power is changed stepwise by the laser power control portion at the timing specified by the timing specification portion, detects as the minimum recording power the recording power when the originally smaller of the predetermined level and that output by the correlation detection portion becomes larger than the other, and sets the optimum recording power.

29. The optical disk apparatus according to claim 28, wherein a temperature change near the optical disk is detected and the timing specification portion specifies a time when that temperature change has reached a predetermined value as the timing for detecting the minimum recording power.

30. The optical disk apparatus according to claim 28, wherein the timing specification portion specifies a time when a predetermined time has passed after detecting the minimum recording power as the timing for detecting the minimum recording power.

31. The optical disk apparatus according to claim 28, further including a factor setting portion for setting the value of said recording compensating factor.

32. The optical disk apparatus according to claim 31, wherein the factor setting portion sets the value of said recording compensating factor in accordance with a temperature of the optical disk.

33. The optical disk apparatus according to claim 31, wherein the factor setting portion sets the value of said recording compensating factor in accordance with a linear speed of the optical disk.

34. The optical disk apparatus according to claim 31, wherein the factor setting portion sets the value of said recording compensating factor in accordance with a focusing condition of the light beam.

35. The optical disk apparatus according to claim 34, wherein the focusing condition of the light beam is determined from the minimum recording power at which reproducible recording marks are formed.

36. The optical disk apparatus according to claim 31,
wherein the optical disk apparatus records data by irradiating the light beam intermittently; and
wherein the factor setting portion sets the value of said recording compensating factor in accordance with an intermittency ratio of the light beam.

* * * * *